United States Patent
Zhang et al.

(10) Patent No.: US 10,772,110 B2
(45) Date of Patent: Sep. 8, 2020

(54) UNIVERSAL CHANNEL RESERVATION SIGNAL FOR MEDIUM SHARING

(71) Applicant: QUALCOMM Incorporated, San Diego, CA (US)

(72) Inventors: Xiaoxia Zhang, San Diego, CA (US); Tamer Kadous, San Diego, CA (US); Yongbin Wei, La Jolla, CA (US); Zhifei Fan, San Diego, CA (US); Jing Sun, San Diego, CA (US); Aleksandar Damnjanovic, Del Mar, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/155,515

(22) Filed: Oct. 9, 2018

(65) Prior Publication Data

US 2019/0141723 A1    May 9, 2019

Related U.S. Application Data

(60) Provisional application No. 62/582,459, filed on Nov. 7, 2017.

(51) Int. Cl.
*H04W 72/12* (2009.01)
*H04W 16/14* (2009.01)
(Continued)

(52) U.S. Cl.
CPC .......... *H04W 72/12* (2013.01); *H04W 16/14* (2013.01); *H04W 72/04* (2013.01); *H04W 74/0816* (2013.01); *H04W 84/12* (2013.01)

(58) Field of Classification Search
CPC ..... H04W 72/12; H04W 72/04; H04W 16/14; H04W 74/0816; H04W 84/12
See application file for complete search history.

(56) References Cited

U.S. PATENT DOCUMENTS

| 2009/0122765 A1* | 5/2009 | Dimou | H04W 88/06 370/336 |
| 2017/0142592 A1* | 5/2017 | Fischer | H04W 16/14 |

(Continued)

FOREIGN PATENT DOCUMENTS

| WO | WO-2012064502 A1 | 5/2012 |
| WO | WO-2017027807 A2 | 2/2017 |

OTHER PUBLICATIONS

International Search Report and Written Opinion—PCT/US2018/055266—ISA/EPO—dated Dec. 11, 2018.

*Primary Examiner* — Ricky Q Ngo
*Assistant Examiner* — Stephen N Steiner
(74) *Attorney, Agent, or Firm* — Liem T. Do

(57) ABSTRACT

Wireless communications systems and methods related to signaling medium reservation information medium sharing among multiple radio technologies (RATs) are provided. A wireless communication device of a first RAT detects a channel reservation signal of a second RAT in a spectrum shared by the first RAT and the second RAT. The wireless communication device determines whether the channel reservation signal indicates a first transmission opportunity (TXOP) duration or a second TXOP duration that is different from the first TXOP duration. The wireless communication device selects, based on the determination, at least one of performing a backoff or continuing to monitor the spectrum.

28 Claims, 14 Drawing Sheets

(51) Int. Cl.
  *H04W 72/04* (2009.01)
  *H04W 74/08* (2009.01)
  *H04W 84/12* (2009.01)

(56) References Cited

U.S. PATENT DOCUMENTS

2017/0202022 A1 7/2017 Chendamarai et al.
2019/0053222 A1* 2/2019 Bhorkar ................ H04W 16/14

* cited by examiner

UNIVERSAL CHANNEL RESERVATION SIGNAL FOR MEDIUM SHARING

CROSS REFERENCE TO RELATED APPLICATIONS

The present application claims priority to and the benefit of the U.S. Provisional Patent Application No. 62/582,459, filed Nov. 7, 2017, which is hereby incorporated by reference in its entirety as if fully set forth below and for all applicable purposes.

TECHNICAL FIELD

This application relates to wireless communication systems and methods, and more particularly to signaling medium reservation information for medium sharing among multiple radio access technologies (RATs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies o are advancing from the LTE technology to a next generation new radio (NR) technology. NR may provision for dynamic medium sharing among network operators of the same RATs and/or different RATs in a licensed spectrum, a shared spectrum, and/or an unlicensed spectrum. For example, NR and Institute of Electrical and Electronics Engineers (IEEE) 802.11 (WiFi) technologies may be deployed over the same spectrum.

An approach to sharing a communication medium or spectrum among multiple RATs is to employ a listen-before-talk (LBT) procedure to ensure a particular channel is clear before transmitting a message. For example, a transmitting node may listen to the channel to determine whether there are active transmissions in the channel based on energy detection. While energy detection may have low computational complexity, energy detection-based LBT may provide limited system performance, for example, missed detection and/or false detection may occur. A missed detection may lead to collision and a false detection may cause resource (e.g., spectrum) to be underutilized.

To improve the performance, signaling-based over-the-air (OTA) channel reservation may be used. For example, a transmitting node may transmit a channel reservation signal including a specific preamble sequence to indicate the use of the channel prior to transmitting data in the channel. In addition, the transmitting node may include additional reservation information (e.g., a duration of the reservation, a transmit power headroom, a spatial direction, and/or an interference level) in the channel reservation signal to allow monitoring nodes to better utilize and share the spectrum. The inclusion of the preamble sequence in the channel reservation signal can allow for asynchronous and/or synchronous medium sharing among different network operators.

While signaling-based channel reservations can improve medium sharing performance or efficiency, different RATs may use different numerologies (e.g., subcarrier spacing). For example, NR subcarrier spacing may not be an integer multiple of WiFi subcarrier spacing. In addition, different NR nodes may use different sampling frequencies. As such, a monitoring node may be required to perform resampling in order to detect a preamble sequence and/or to decode of channel reservation information transmitted by a node using a different subcarrier spacing and/or a different sampling frequency than the monitoring node. Thus, signaling-based channel reservation detection can be computationally expensive.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication including detecting, by a wireless communication device of a first radio access technology (RAT), a channel reservation signal of a second RAT in a spectrum shared by the first RAT and the second RAT; determining, by the wireless communication device, whether the channel reservation signal indicates a first transmission opportunity (TXOP) duration or a second TXOP duration that is different from the first TXOP duration; and selecting, based on the determination, at least one of performing a backoff or continuing to monitor the spectrum.

In an additional aspect of the disclosure, a method of wireless communication including identifying, by a wireless communication device of a first radio access technology (RAT), a transmission opportunity (TXOP) in a spectrum shared by the first RAT and a second RAT; determining, by the wireless communication device, whether the TXOP includes a first TXOP duration or a second TXOP duration that is different from the first TXOP duration; and selecting, based on the determination, at least one of transmitting a first channel reservation signal associated with the first TXOP duration or transmitting a second channel reservation signal associated with the second TXOP duration.

In an additional aspect of the disclosure, an apparatus including a transceiver configured to detect a channel reservation signal of a second radio access technology (RAT) in a spectrum shared by a first RAT and the second RAT, wherein the apparatus is associated with the first RAT; and a processor configured to determine whether the channel reservation signal indicates a first transmission opportunity (TXOP) duration or a second TXOP duration that is different from the first TXOP duration; and select, based on the determination, at least one of performing a backoff or continuing to monitor the spectrum.

In an additional aspect of the disclosure, an apparatus including a transceiver; and a processor configured to identify a transmission opportunity (TXOP) in a spectrum shared by a first radio access technology (RAT) and a second RAT, wherein the apparatus is assoicated with the first RAT; determine whether the TXOP includes a first TXOP duration or a second TXOP duration that is different from the first TXOP duration; and select, based on the determination, at least one of configuring the transceiver to transmit a first channel reservation signal associated with the first TXOP duration or configuring the transceiver to transmit a second channel reservation signal associated with the second TXOP duration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
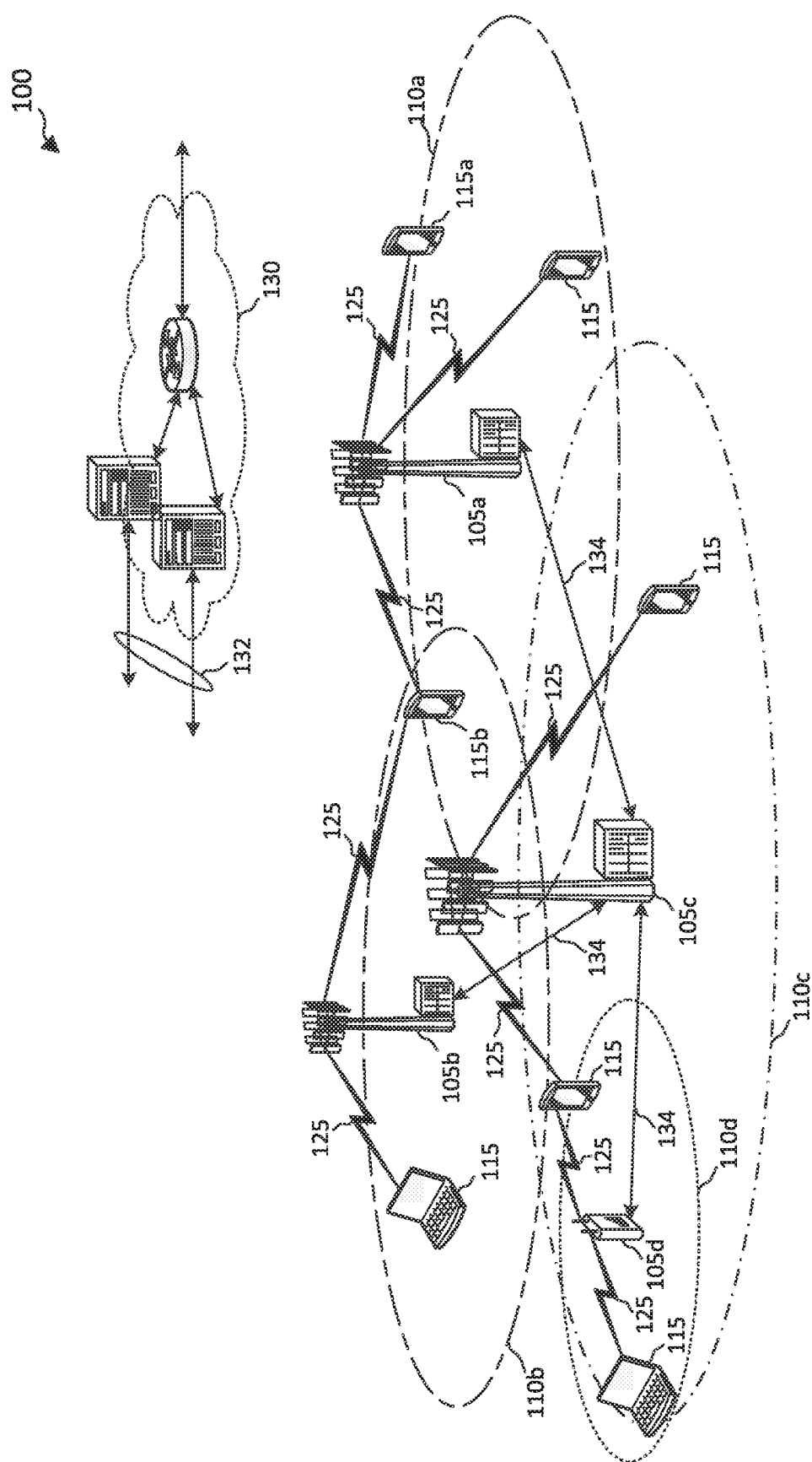
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) or new radio (NR) network.

The present application describes mechanisms for signaling medium reservation information for medium sharing among multiple RATs. In the disclosed embodiments, inter-RAT medium sharing is based on a predetermined TXOP duration (e.g., X milliseconds (ms)). Depending on the traffic load, a reserving or transmitting node may or may not occupy the entire reserved TXOP. The disclosed embodiments allow nodes of the same RAT to utilize any remaining portion of the reserved TXOP for intra-RAT sharing. In other words, a subsequent reservation or TXOP for intra-RAT sharing can only include a duration that is less than the predetermined TOXP duration (e.g., <X ms). The disclosed embodiments employ a channel reservation signal including a preamble portion and a message portion to indicate a TXOP reservation in the spectrum. The preamble portion can carry one of two hypotheses, for example, indicating whether a TXOP has a duration of X ms (e.g., for inter-RAT sharing) or a duration less than Xms (e.g., for intra-RAT sharing). The message portion may include RAT-specific medium occupation information. Different RATs may use different numerologies (e.g., subcarrier spacing and/or sampling rate). For example, the multi-RAT sharing can be between a WiFi-based technology and an NR-based technology.

In an embodiment, NR nodes may transmit and/or detect a channel reservation signal using NR numerology and WiFi nodes may transmit and/or detect channel reservation signal using WiFi numerology. The preamble portion may include a repeating short-period waveform sequence mapped to a set of subcarrier or tone locations. The different hypotheses can be indicated using different repeating waveform sequences, different tone locations, and/or different phase shifts across adjacent waveform sequences. To minimize impact on WiFi nodes, the preamble portion can be similar to the short training field (STF) in a WiFi preamble. When a reserving node is a WiFi node, the message portion can include a long training field (LTF) and a legacy-signal (L-SIG) similar to the LTF and L-SIG field in a WiFi preamble. Alternatively, when a reserving node is an NR node, the message portion can include an NR scheduling or allocation message.

In another embodiment, NR nodes and WiFi nodes may transmit and/or detect at least the preamble portion of a channel reservation signal based on WiFi numerology. In such an embodiment, the preamble portion can include the same structure as a WiFi preamble, for example, including an STF, an LTF, a L-SIG field, and/or a data field. For example, the L-SIG field or the data field may indicate whether the reservation duration is X ms or less than X ms. In such an embodiment, a reserving WiFi node may transmit an additional WiFi preamble (e.g., including an STF, an LTF, and an L-SIG field) in the message portion of the channel reservation signal for medium sharing among WiFi nodes. Alternatively, the L-SIG field or the data field may indicate a limited number of reservation durations (e.g., in steps of about 0.5 ms or about 1 ms).

For inter-RAT sharing, a monitoring node may determine whether a channel reservation signal is transmitted by a node of the same RAT or of a different RAT based on whether decoding of the message portion is successful or not. When detecting a channel reservation signal transmitted by a node of another RAT with a reservation duration of X ms, the monitoring node may backoff based on the X ms. Alternatively, when detecting a channel reservation signal transmitted by a node of another RAT with a reservation duration less than X ms, the monitoring node may continue to monitor the spectrum.

Aspects of the present application can provide several benefits. For example, the use of a repeating waveform sequence in the preamble portion allow for autocorrelation-based detection without the need for resampling or data decoding at a receiver, and thus may allow for a low computationally complexity implementation at the receiver. The reuse of a WiFi STF in the preamble portion of a channel reservation signal and the reuse of a WiFi LTF and a WiFi L-SIG in the message portion of the channel reservation signal allows existing WiFi receivers to operate without the need for upgrades or replacements. The reuse of a WiFi preamble in the preamble portion of a channel reservation signal can further minimize changes at WiFi transmitters and/or WiFi receivers. While the disclosed embodiments may be described in the context of NR-based technology and WiFi-based technology, the disclosed embodiments are suitable for use in any wireless communication network with any type of RAT and any number of RATs.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. In addition, the network 100 may include multiple RATs. For example, some BSs 105 and/or UEs 115 may communicate over a spectrum using NR-based technology, while other BSs 105 and/or other UEs 115 may share the same spectrum for communications using WiFi-based technology. Mechanisms for medium sharing across multiple RATs are described in greater detail herein.

Figure 2:
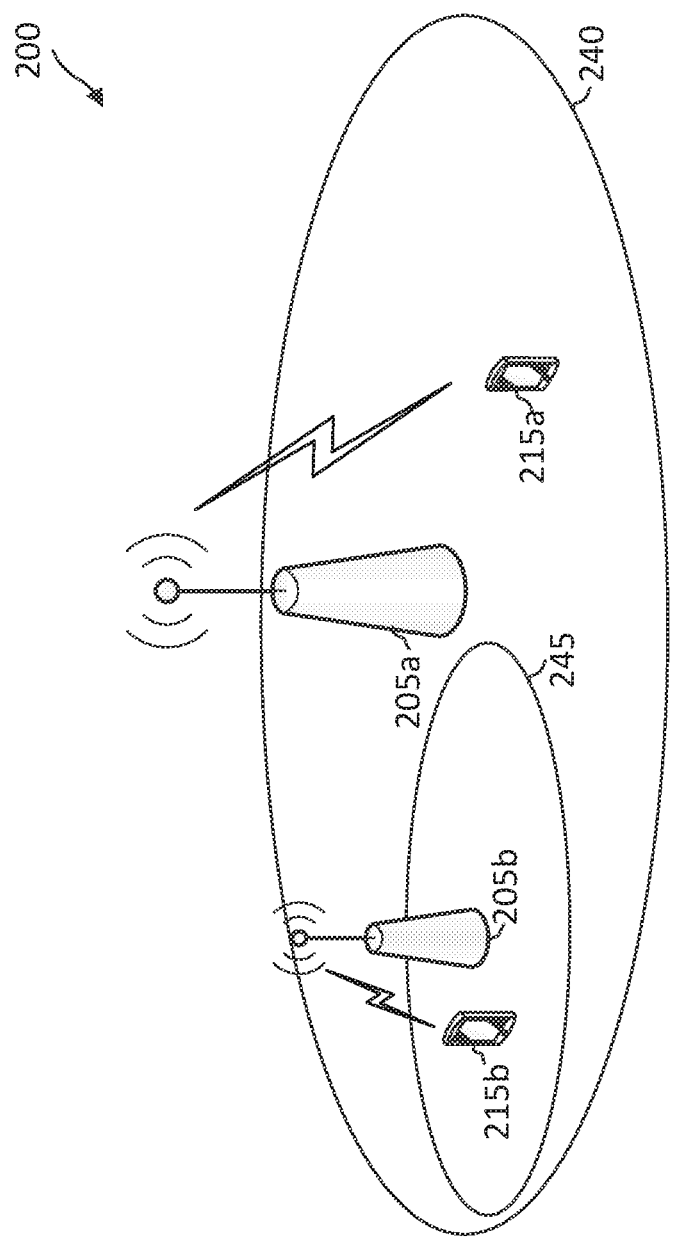
FIG. 2 illustrates an example of a wireless communications network that supports medium sharing across multiple radio access technologies (RATs) according to embodiments of the present disclosure.

FIG. 2 illustrates an example of a wireless communications network 200 that supports medium sharing across multiple RATs according to embodiments of the present disclosure. The network 200 may be similar to the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively.

In the network 200, the BS 205a serves the UE 215a in a serving cell or a coverage area 240 using a first RAT, while the BS 205b serves the UE 215b in a serving cell or a coverage area 245 using a second RAT. The first RAT and the second RAT may be different RATs. For example, the first RAT may be an NR-based technology and the second RAT may be a WiFi-based technology. The BSs 205 and the UEs 215 of different RATs may communicate over the same spectrum using an LBT procedure. For example, the different RATs may be deployed over an unlicensed frequency band, for example, in the 6 gigahertz (GHz) frequency band with a bandwidth of about 500 megahertz (MHz).

To perform LBT, the BS 205a may listen to the channel. When the channel is clear, the BS 205a may transmit a reservation signal to reserve a TXOP in the spectrum. The reservation signal can silence nodes (e.g., the BS 205b and/or other UE 215b) of the other RAT. Subsequently, the BS 205a may communicate with the UE 215a in the spectrum during the reserved TXOP.

To minimize the detection complexity across different RATs, the network 200 may employ waveform-based channel reservation signals to allow for autocorrelation-based detection.

To allow medium sharing between WiFi nodes and NR nodes with minimal impact to WiFi nodes, the network 200 may employ a WiFi numerology for channel reservation signal transmissions. For example, some WiFi nodes may implement WiFi preamble detection in hardware components, which may not be easily changed or may not be software programmable. Thus, using channel reservation signals with modifications to the WiFi preamble structure and/or additions to WiFi sync field or data field may require WiFi nodes to be replaced with new hardware components, which may be costly. Mechanisms for sharing a medium across different RATs, for example, between NR and WiFi, are described in greater detail herein.

Figure 3:
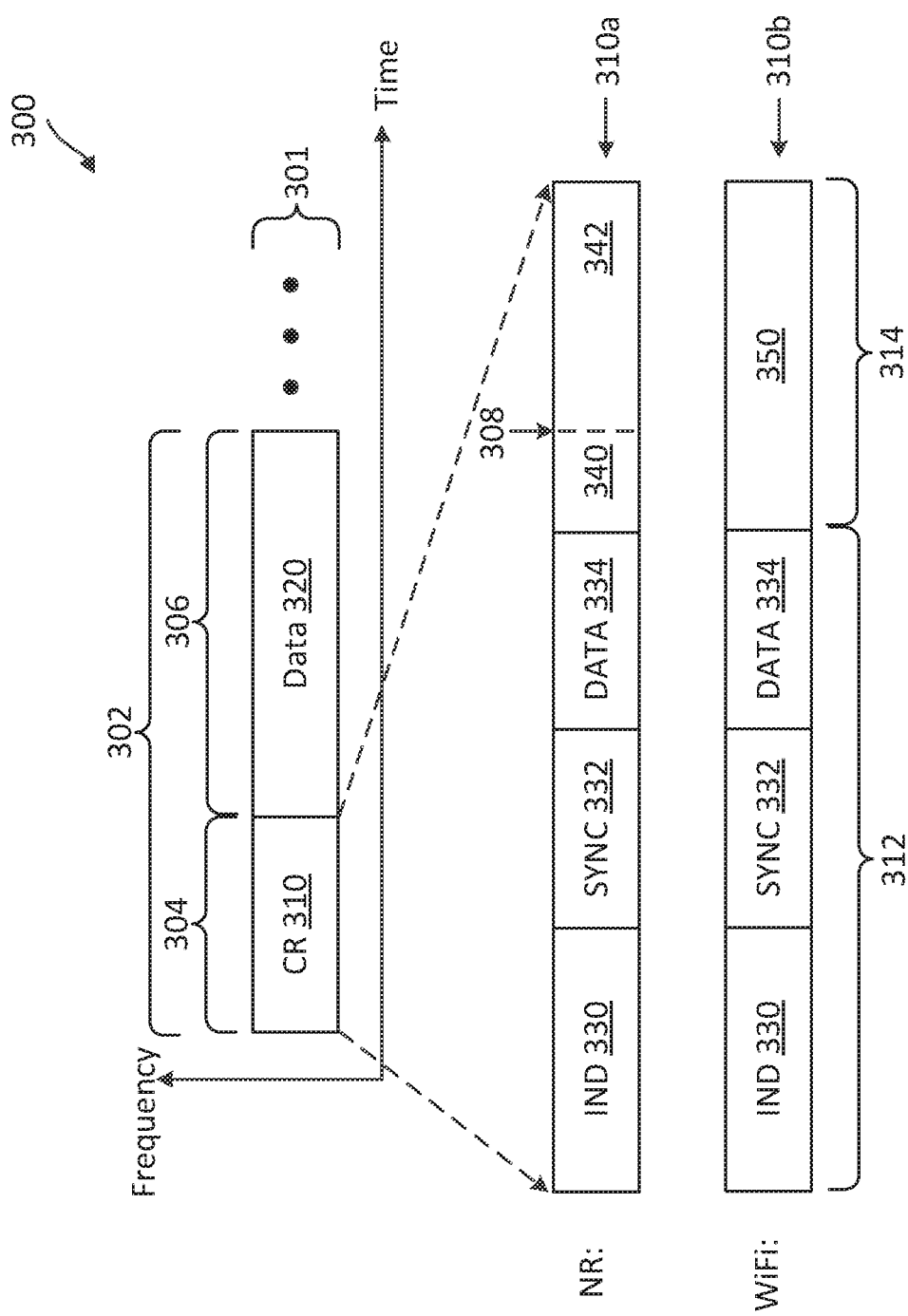
FIG. 3 illustrates a multi-RAT medium sharing scheme according to embodiments of the present disclosure.

FIG. 3 illustrates a multi-RAT medium sharing scheme 300 according to embodiments of the present disclosure. The x-axis represents time in some constant units. The y-axis represents frequency in some constant units. The scheme 300 may be employed by nodes or devices of different RATs, such as the BSs 105 and 205 and the UEs 115 and 215, to communicate over a shared spectrum 301. In the scheme 300, communications in the spectrum 301 may be in units of TXOP 302. A TXOP 302 may include a channel sensing period 304 followed by a transmission period 306.

As an example, a serving node (e.g., the BSs 105 and 205) of a particular RAT may monitor the channel (e.g., the spectrum 301) and determine that the channel is idle. Upon determining the channel is idle, the serving node may transmit a channel reservation signal 310 in the spectrum 301 to reserve a TXOP 302. The serving node may transmit the channel reservation signal 310 in the channel sensing period 304 of the TXOP 302. The channel reservation signal 310 may indicate that the TXOP 302 is reserved and may additionally indicate a duration of the reservation (e.g., the duration of the TXOP 302). After transmitting the channel reservation signal 310, the serving node may exchange data 320 (e.g., a UL data burst or a DL data burst) with a corresponding node (e.g., the UEs 115 and 215) during the transmission period 306.

An aggressor node (e.g., of another RAT) contending for the channel may monitor the spectrum 301. Upon detection of the channel reservation signal 310, the aggressor node may obtain reservation information (e.g., the duration of the TXOP 302) from the channel reservation signal 310 and backoff from accessing the spectrum 301 based on the reservation information signaled by the channel reservation signal 310.

The channel reservation signal 310 may include a preamble portion 312 and a message portion 314. The preamble portion 312 carries reservation information for inter-RAT medium sharing. The message portion 314 carries RAT-specific channel reservation information. The channel reservation signal 310 can be configured such that a node may transmit and/or monitor for a channel reservation signal 310 using a numerology of a RAT corresponding to the node. In other words, a WiFi node may transmit a channel reservation signal 310 and/or detect the presence of a channel reservation signal 310 (e.g., the preamble portion 312) using a WiFi numerology. Similarly, an NR node may transmit a channel reservation signal 310 and/or detect the presence of a channel reservation signal 310 using an NR numerology.

The preamble portion 312 may include an indication (IND) portion 330, a synchronization (SYNC) portion 332, and a data portion 334. The indication portion 330 indicates the presence of an ongoing transmission (e.g., the channel reservation signal 310 reserving the TXOP 302). The indication portion 330 may include repetitions (e.g., about 10) of a short-period waveform sequence, denoted as S1. For example, the number of repetitions may be about 10 and the waveform sequence S1 may have a duration of about 0.8 microsecond (μs). A monitoring node (e.g., an aggressor node) may detect the presence of the channel reservation signal 310 based on autocorrelation.

The synchronization portion 332 may include repetitions of a short-period waveform sequence, for example, with a 180 degrees phase shift compared to the waveform sequence S1 and may be represented by −S1. In some instances, the synchronization portion 332 may include repetitions of another short waveform sequence. The synchronization portion 332 allows for time and/or frequency acquisition. For example, a monitoring node may refine timing and/or frequency synchronization by applying cross-correlation after detecting the presence of the channel reservation signal 310.

The data portion 334 may include reservation information (e.g., a duration of the TXOP 302) associated with the TXOP 302. To reduce complexity, the reservation duration may allow a limited number of reservation duration resolutions (e.g., in units of milliseconds (ms)) and the different durations may be represented by different waveforms. For example, the reservation duration may be represented by a plurality of information bits and the information bits may be encoded into a plurality of coded bits. The coded bits may be used to mask a repeating short-period waveform sequence, for example, represented by S2. In some embodiments, the coded bits may be masked or carried in phases between adjacent short-period waveforms. In some embodiments, scrambling may be applied to the coded bits to further differentiate the data portion 334 from the indication portion 330 and/or the synchronization portion 332. In some embodiments, the inclusion of the data portion 334 in the preamble portion 312 may be optional.

The message portion 314 may include RAT-specific medium occupation information, such as a reservation duration, a transmission power headroom, and/or an interference level. The RAT-specific medium occupation information can facilitate inter-RAT medium sharing. As shown, a WiFi node may transmit a channel reservation signal 310a including a WiFi channel reservation message 350 in the message portion 314. The WiFi channel reservation message 350 may include a long training field (LTF), a legacy-signal (L-SIG) field, a network allocation vector (NAV), and/or a data field. For example, the NAV may indicate a duration of the TXOP 302 duration with a resolution of about 4 μs.

An NR node may transmit a channel reservation signal 310b including a dynamic cyclic prefix (CP) 340 and a control message 342 in the message portion 314. When employing OFDM, the control message 342 is required to align to an OFDM symbol boundary. The dynamic CP 340 functions as a filler to align the control message 342 to an OFDM symbol boundary as shown by the arrow 308. The dynamic CP 340 may have an extended duration compared to a normal CP under NR operations. The NR node may transmit the control message 342 in an NR control channel, which may be referred to as a physical downlink control channel (PDCCH). The control message 342 may indicate DL and/or UL allocations, for example, in the form of downlink control information (DCI).

As descried above, some WiFi nodes may implement preamble detection in hardware components, which may not be software programmable. Thus, while the scheme 300 may allow for inter-RAT medium sharing, for example, between WiFi nodes and NR nodes, the upgrading and/or replacement of WiFi nodes required for implementing the scheme 300 may be costly. The disclosed embodiments provide several channel reservation signal configurations that may minimize impact on WiFi transmitters and/or WiFi receivers.

Figure 4:
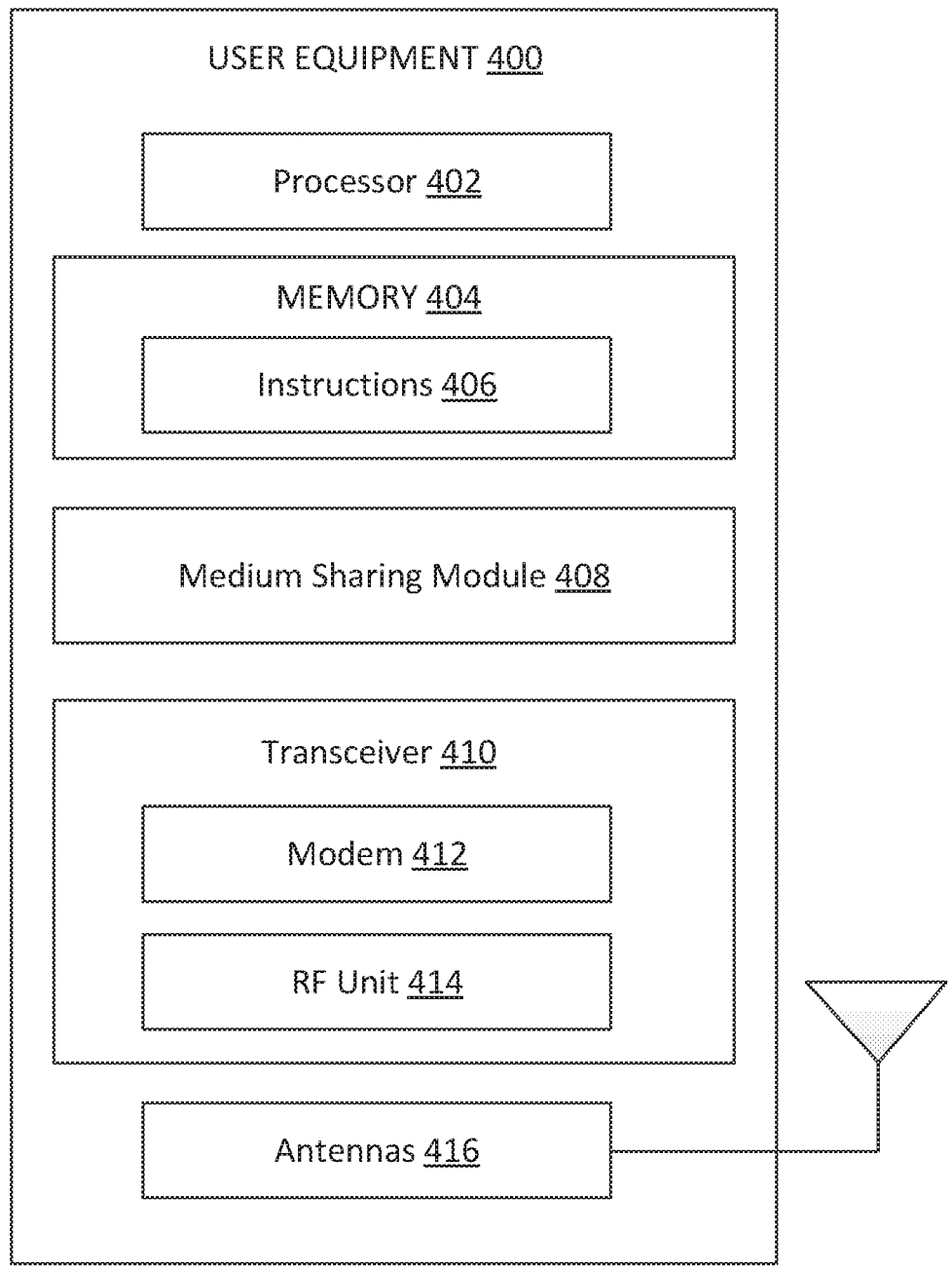
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 or 215 as discussed above. As shown, the UE 400 may include a processor 402, a memory 404, a medium sharing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 215 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The medium sharing module 408 may be implemented via hardware, software, or combinations thereof. For example, the medium sharing module 408 may be implemented as a processor, circuit, and/or instructions 406 stored in the memory 404 and executed by the processor 402. The medium sharing module 408 may be used for various aspects of the present disclosure. For example, the medium sharing module 408 is configured to monitor for channel reservation signals (e.g., the channel reservation signals 310) transmitted by multiple RATs (e.g., NR and WiFi), determine medium reservation information from the detected channel reservation signals, generate and transmit channel reservation signals using numerologies of one or more RATs, and/or perform LBT, as described in greater detail herein.

As shown, the transceiver 410 may include the modem subsystem 412 and the RF unit 414. The transceiver 410 can be configured to communicate bi-directionally with other devices, such as the BSs 105 and 205. The modem subsystem 412 may be configured to modulate and/or encode the data from the memory 404, and/or the medium sharing module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 215 or a BS 105 or 205. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 215 to enable the UE 215 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of URSs according to embodiments of the present disclosure. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
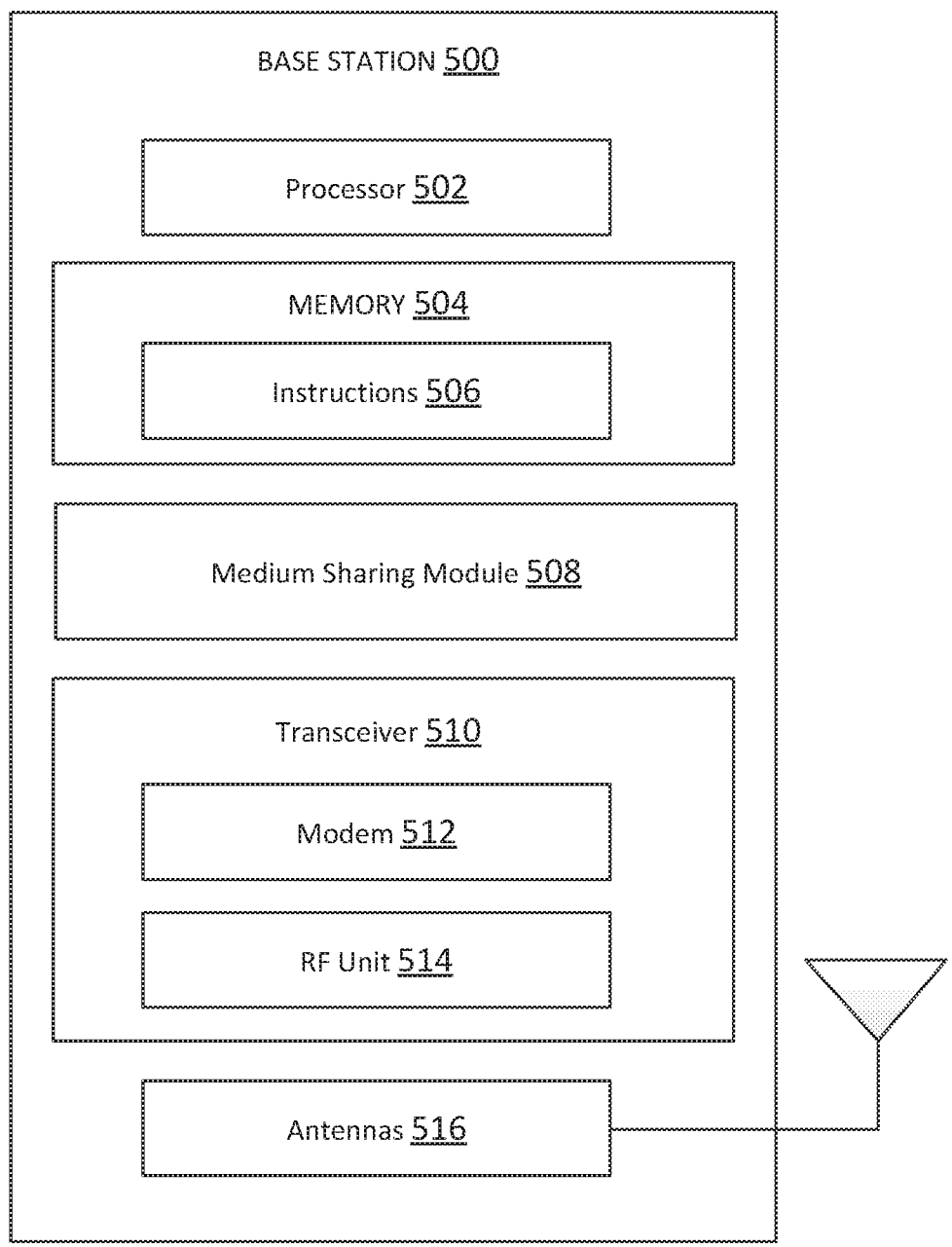
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 or 205 as discussed above. A shown, the BS 500 may include a processor 502, a memory 504, a medium sharing module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The medium sharing module 508 may be implemented via hardware, software, or combinations thereof. For example, the medium sharing module 508 may be implemented as a processor, circuit, and/or instructions 506 stored in the memory 504 and executed by the processor 502. The medium sharing module 508 may be used for various aspects of the present disclosure. For example, the medium sharing module 508 is configured to monitor for channel reservation signals (e.g., the channel reservation signals 310) transmitted by multiple RATs (e.g., NR and WiFi), determine medium reservation information from the detected channel reservation signals, generate and transmit channel reservation signals using numerologies of one or more RATs, and/or perform LBT, as described in greater detail herein.

As shown, the transceiver 510 may include the modem subsystem 512 and the RF unit 514. The transceiver 510 can be configured to communicate bi-directionally with other devices, such as the UEs 115 and 215 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115, 215, or 400. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 or 205 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115, 215, or 400 according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

Figure 6:
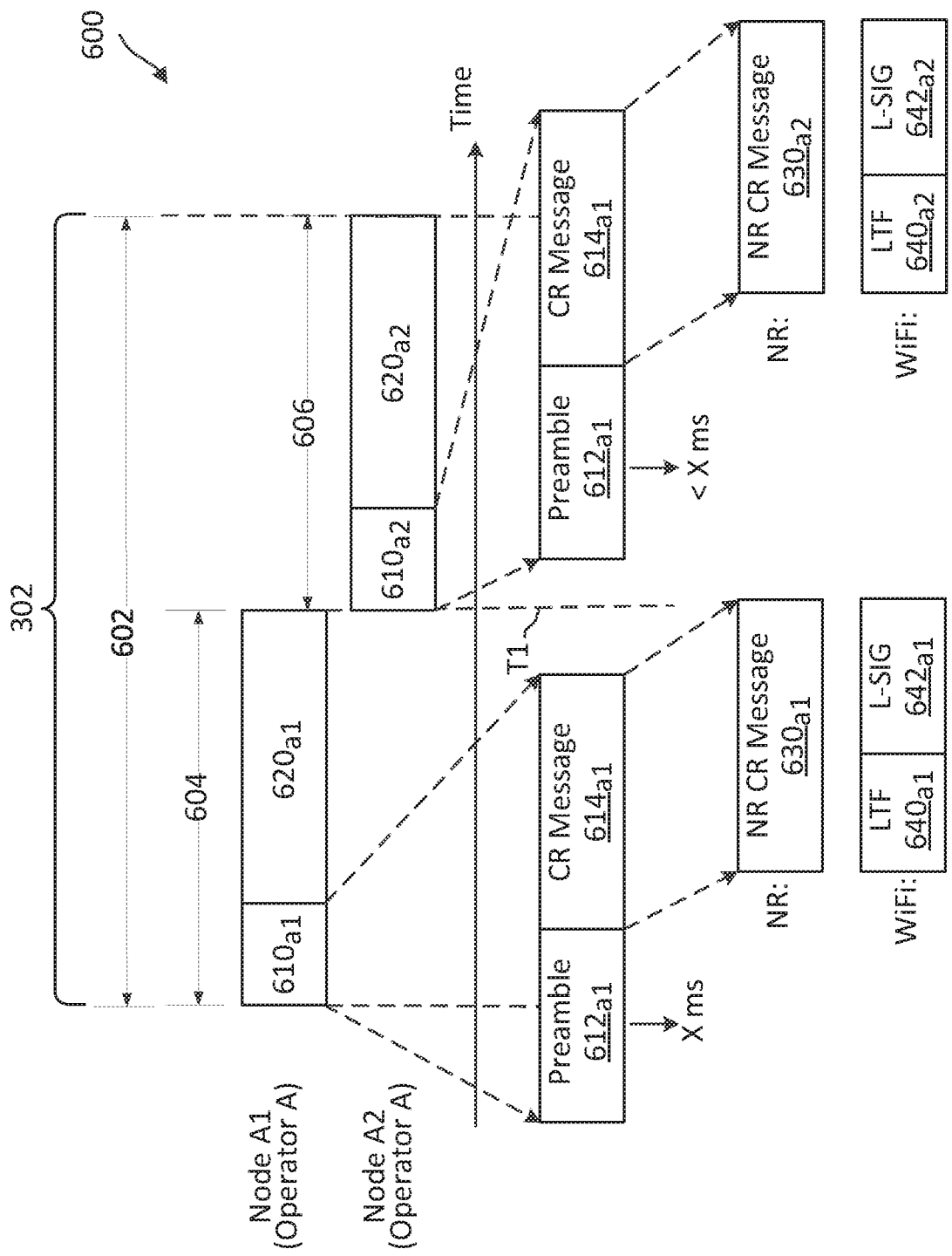
FIG. 6 illustrates a channel reservation scheme for multi-RAT medium sharing according to embodiments of the present disclosure.

FIG. 6 illustrates a channel reservation scheme 600 for multi-RAT medium sharing according to embodiments of the present disclosure. In FIG. 6, the x-axis represents time in some constant units. The scheme 600 may be employed by nodes or devices (e.g., BSs 105 and 205 and the UEs 115 and 215) of different RATs (e.g., NR and WiFi) to communicate over a shared spectrum (e.g., the spectrum 301). In the scheme 600, inter-RAT medium sharing may be based on TXOPs 302 with a predetermined TXOP duration 602 (e.g., a fixed duration of about 5 ms). Depending on the traffic load, a reserving node may or may not occupy the entire reserved TXOP duration 602. The scheme 600 allows nodes of the same RAT to utilize any remaining portion of the reserved TXOP 302, but disallows nodes of another RAT to share the remaining portion.

The scheme 600 employs a channel reservation signal 610 including a preamble portion 612 and a channel reservation (CR) message portion 614. The preamble portion 612 may be substantially similar to the indication portion 330. For example, the preamble portion 612 may include repetitions of a short-period waveform sequence similar to the STF in a WiFi preamble. In the scheme 600, the preamble portion 612 can carry two hypotheses. The preamble portion 612 may indicate whether the reservation duration equals to the predetermined TXOP duration 602 (e.g., X ms) or less than the predetermined TXOP duration 602 (e.g., <X ms). The use of repeating waveforms in the preamble portion 612 allows any node (e.g., WiFi and NR nodes) to detect the presence of the channel reservation signal 610 based on autocorrelation without resampling. In addition, each node of a particular RAT may transmit or detect channel reservation signals 610 using the numerology of the particular RAT. Configurations of the channel reservation signals 610 are described in greater detail herein.

The message portion 614 may include RAT-specific and/or operator-specific medium occupation information. For example, an NR node may transmit an NR channel reservation message 630 or an NR PDCCH message in the message portion 614 using an NR numerology, whereas a WiFi node may transmit an LTF 640, an L-SIG field 642, and/or any additional data field in the message portion 614 using a WiFi numerology. A monitoring node may determine whether a detected channel reservation signal 610 is transmitted by a node of the same RAT or by a node of a different RAT based on whether the decoding of the message portion 614 is successful, as described in greater detail herein.

As an example, a node A of an operator A (e.g., a WiFi operator or an NR operator) transmits a channel reservation signal $610_{a1}$ to reserve a TXOP 302 in the channel. The channel reservation signal $610_{a1}$ may indicate the predetermined TXOP duration 602. The channel reservation signal $610_{a1}$ is intended to silence nodes of other RATs for RAT-level medium sharing. After transmitting the channel reservation signal $610_{a1}$, the node A communicates data $620_{a1}$ with a corresponding node in the channel using a portion 604 of the TXOP 302. As shown, the node A completed the communication of the data $620_{a1}$ before the end of the TXOP 302, for example, at a time T1.

At time T1, a node A2 of the same operator A may detect that the channel is clear and may transmit a channel reservation signal $610_{a2}$ to reserve a remaining portion 606 of the TXOP 302. The channel reservation signal $610_{a2}$ is intended to silence nodes of the same RAT for intra-RAT medium sharing. After transmitting the channel reservation signal $610_{a2}$, the node A2 may communicate data $620_{a2}$ with a corresponding node in the channel.

Figure 7:
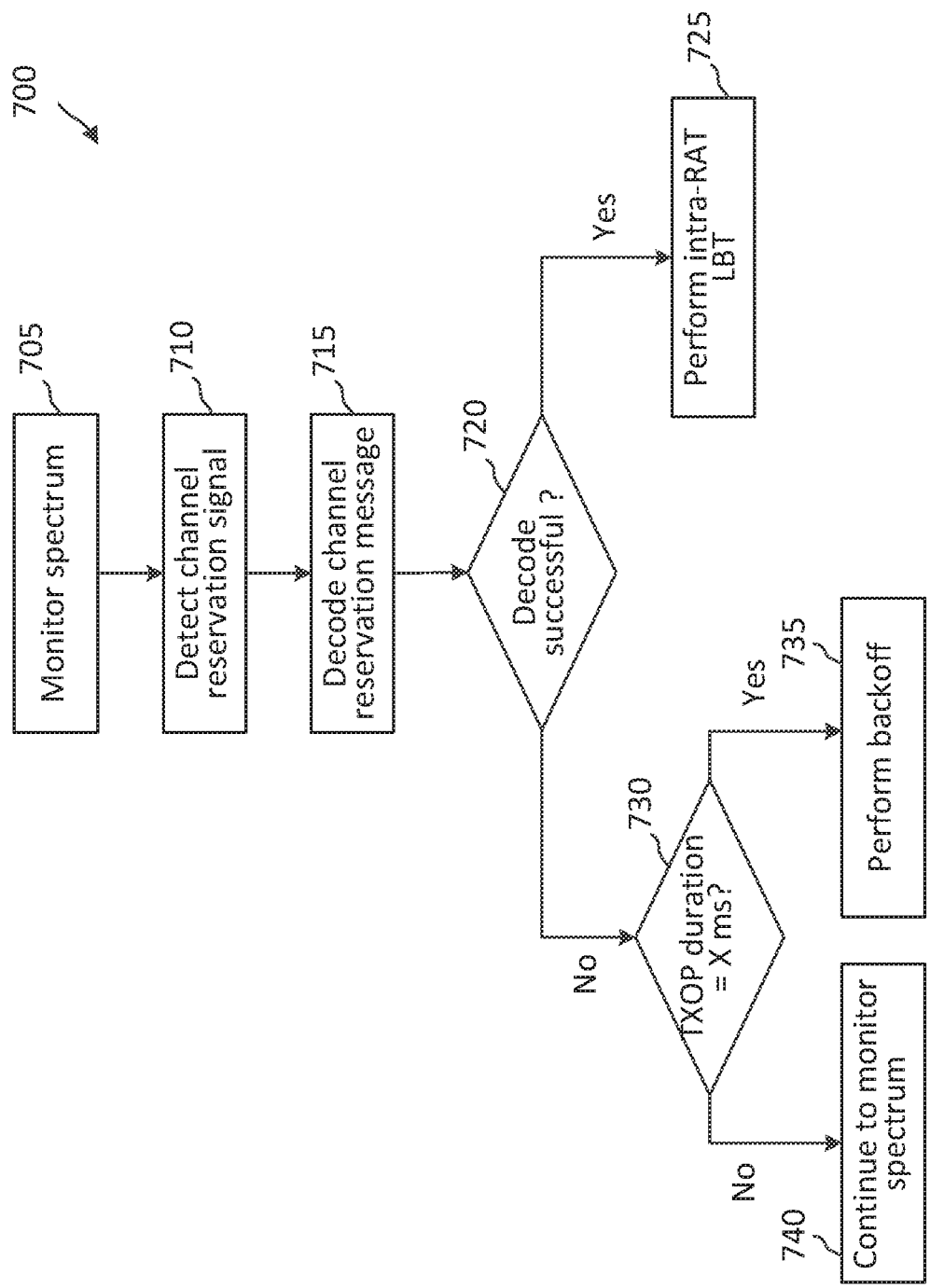
FIG. 7 is a flow diagram of a channel detection method for multi-RAT medium sharing according to embodiments of the present disclosure.

FIG. 7 is a flow diagram of a channel detection method 700 for multi-RAT medium sharing according to embodiments of the present disclosure. Steps of the method 700 can be executed by a computing device (e.g., a processor, processing circuit, and/or other suitable component) of a wireless communication device, such as the BSs 105, 205, and 500, the UEs 115, 215, and 400. The method 700 may be used in conjunction with the channel reservation scheme 600 described with respect to FIG. 6. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 705, the method 700 includes monitoring a spectrum (e.g., the spectrum 301), for example, to determine whether the channel is busy or idle. At step 710, the method 700 includes detecting a channel reservation signal (e.g., the channel reservation signal 610) in the spectrum. The channel reservation signal may include a preamble (e.g., the preamble portion 612) and a channel reservation message (e.g., the message portion 614). The detection may be based on autocorrelation.

At step 715, the method 700 includes decoding the channel reservation message. At step 720, the method 700 includes determining whether the decoding of the channel reservation message is successful.

If the decoding is successful indicating that the detected channel reservation signal is transmitted by a node of the same RAT, the method 700 proceeds to step 725. At step 725, the method 700 includes performing intra-RAT LBT, for example, backing off based on a reservation duration indicated in the decoded message.

If the decoding is unsuccessful indicating that the detected channel reservation signal is transmitted by a node of a different RAT, the method 700 proceeds to step 730. At step 730, the method 700 includes determining whether the TXOP duration indicated in the detected channel reservation signal equals to X ms (e.g., the predetermined TXOP duration 602).

If the TXOP duration indicated in the detected channel reservation signal equals to X ms indicating that the detected channel reservation signal is for RAT-level sharing, the method 700 proceeds to step 735. At step 735, the method 700 performs backoff (e.g., by X ms).

If the TXOP duration indicated in the detected channel reservation signal is not X ms (e.g., <X ms) indicating that the detected channel reservation signal is for inter-RAT sharing, the method 700 proceeds to step 740. At step 740, the method 700 includes continuing to monitor the spectrum (e.g., based on energy detection) without backing off.

FIGS. 8-11 illustrate various configurations for waveform-based channel reservation signals (e.g., the channel reservation signals 610) for multi-RAT medium sharing using the scheme 600 and the method 700 described above with respect to FIGS. 6 and 7, respectively.

Figure 8:
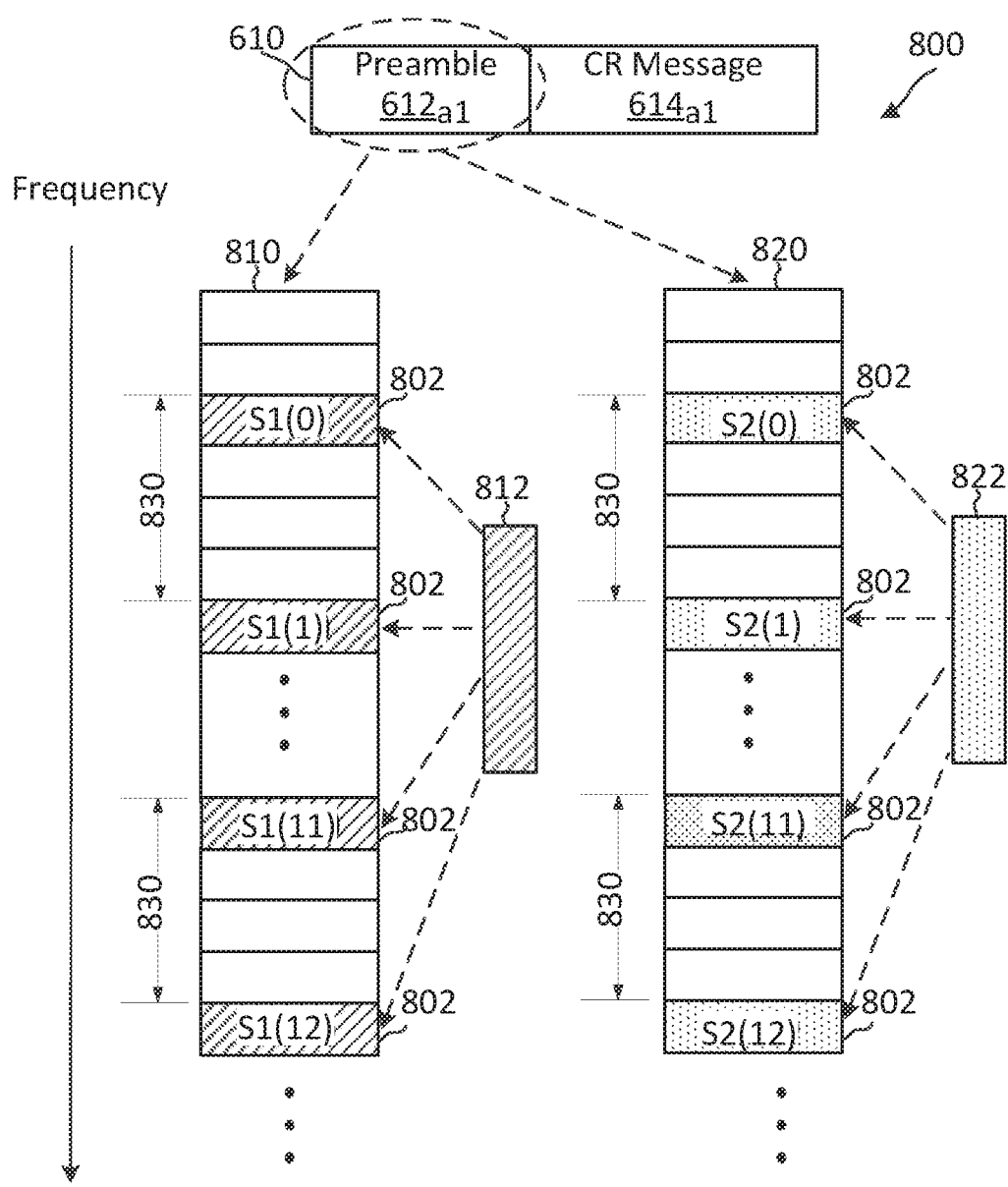
FIG. 8 illustrates a channel reservation signal configuration scheme for multi-RAT medium sharing according to embodiments of the present disclosure.

FIG. 8 illustrates a channel reservation signal configuration scheme 800 for multi-RAT medium sharing according to embodiments of the present disclosure. In FIG. 8, the y-axis represents frequency in some constant units. The scheme 800 may be employed by nodes or devices (e.g., BSs 105 and 205 and the UEs 115 and 215) of different RATs (e.g., NR and WiFi) to transmit a channel reservation signal 610 to reserve a TXOP (e.g., the TXOP 302) in a shared spectrum (e.g., the spectrum 301). The scheme 800 indicates the two TXOP duration hypotheses using different short-period waveform sequences 812 and 822 in the preamble portion 612. The waveform sequences 812 and 822 are represented by S1 and S2, respectively. For example, the waveform sequences 812 and 822 may include different constellation symbols. In some embodiments, the waveform sequence 812 or 822 may be as the STF in a WiFi preamble.

For example, the waveform sequence 812 can be used to indicate a reservation duration of X ms (e.g., the predetermined TXOP duration 602) for RAT-level sharing and the waveform sequence 822 can be used to indicate a reservation duration of less than X ms for intra-RAT sharing. The waveform sequence 812 may be mapped to a set of frequency subcarriers or tones 802 spaced apart by a tone spacing 830 to form a preamble signal 810, which may be repeated in time in the preamble portion 612. Similarly, the waveform sequence 822 may be mapped to the same set of frequency subcarriers or tones 802 to form a preamble signal 820, which may be repeated in time in the preamble portion 612. Thus, a monitoring node may differentiate a channel reservation for sharing across RATs or for sharing within a RAT based on the sequences (e.g., the sequence 812 or the sequence 822) in a detected preamble.

In some embodiments, the tone spacing 830 may be similar to the tone spacing in a WiFi preamble. For example, each tone 802 may occupy a frequency of about 312.5 kilohertz (kHz), and thus the tone spacing 30 may include a frequency of about 1.25 megahertz (MHz). While FIG. 8 illustrates the tone spacing 830 similar to the WiFi preamble structure (e.g., the STF) to reduce impact or changes to WiFi nodes, the tone spacing 830 can be alternatively configured to achieve similar functionalities.

Figure 9:
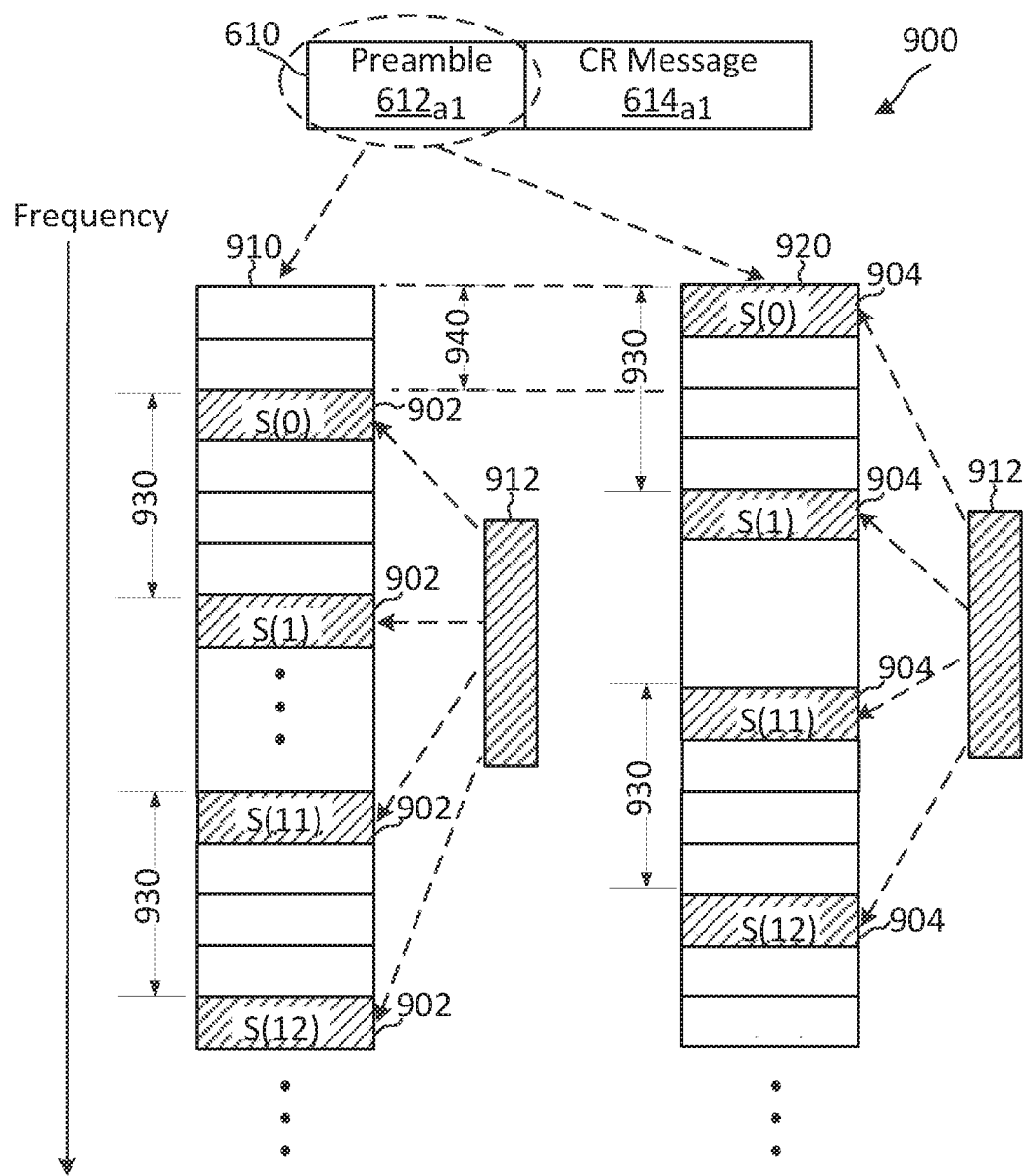
FIG. 9 illustrates a channel reservation signal configuration scheme for multi-RAT medium sharing according to embodiments of the present disclosure.

FIG. 9 illustrates a channel reservation signal configuration scheme 900 for multi-RAT medium sharing according to embodiments of the present disclosure. In FIG. 9, the y-axis represents frequency in some constant units. The scheme 900 may be employed by nodes or devices (e.g., BSs 105 and 205 and the UEs 115 and 215) of different RATs (e.g., NR and WiFi) to transmit a channel reservation signal 610 to reserve a TXOP (e.g., the TXOP 302) in a shared spectrum (e.g., the spectrum 301). The scheme 900 indicates the two TXOP duration hypotheses by mapping a short-period waveform sequence 912 (e.g., the waveform sequences 812 and 822), represented by S, to different tone locations 902 and 904. In some embodiments, the waveform sequence 912 may be the same as the STF in a WiFi preamble.

For example, the tone locations 902 can be used to indicate a reservation duration of X ms (e.g., the predetermined TXOP duration 602) for RAT-level sharing and the tone locations 904 can be used to indicate a reservation duration of less than X ms for intra-RAT sharing. The tone locations 902 and 904 are staggered and offset by a tone offset 940. The waveform sequence 912 may be mapped to the tone locations 902 spaced apart by a tone spacing 930 to form a preamble signal 910, which may be repeated in time in the preamble portion 612. Similarly, the waveform sequence 912 may be mapped to the tone locations 904 spaced apart by the same tone spacing 930 to form a preamble signal 920, which may be repeated in time in the preamble portion 612. Thus, a monitoring node may differentiate a channel reservation for sharing across RATs or for sharing within a RAT based on the tone locations (e.g., the tone locations 902 or the tone locations 904) of the sequences in a detected preamble.

In some embodiments, the tone spacing 930 may be similar to the tone spacing in a WiFi preamble. For example, each tone may occupy a frequency of about 312.5 kilohertz (kHz), and thus the tone spacing 930 may include a frequency of about 1.25 megahertz (MHz) and the tone offset 940 may be about 625 kHz. For example, the tone locations 902 may correspond to tone locations in a WiFi preamble structure (e.g., the STF). Thus, the preamble signal 920 may have a frequency offset compared to the WiFi preamble. When a WiFi node receives the preamble signal 920 in a channel reservation signal, the WiFi node may take into account the frequency offset for subsequent processing, for example, when decoding the message portion 614 (e.g., LTF, L-SIG, and data field) of the channel reservation signal 610. While FIG. 9 illustrates the tone spacing 930 similar to the WiFi preamble structure to reduce impact or changes to WiFi nodes, the tone spacing 930 can be alternatively configured to achieve similar functionalities.

Figure 10:
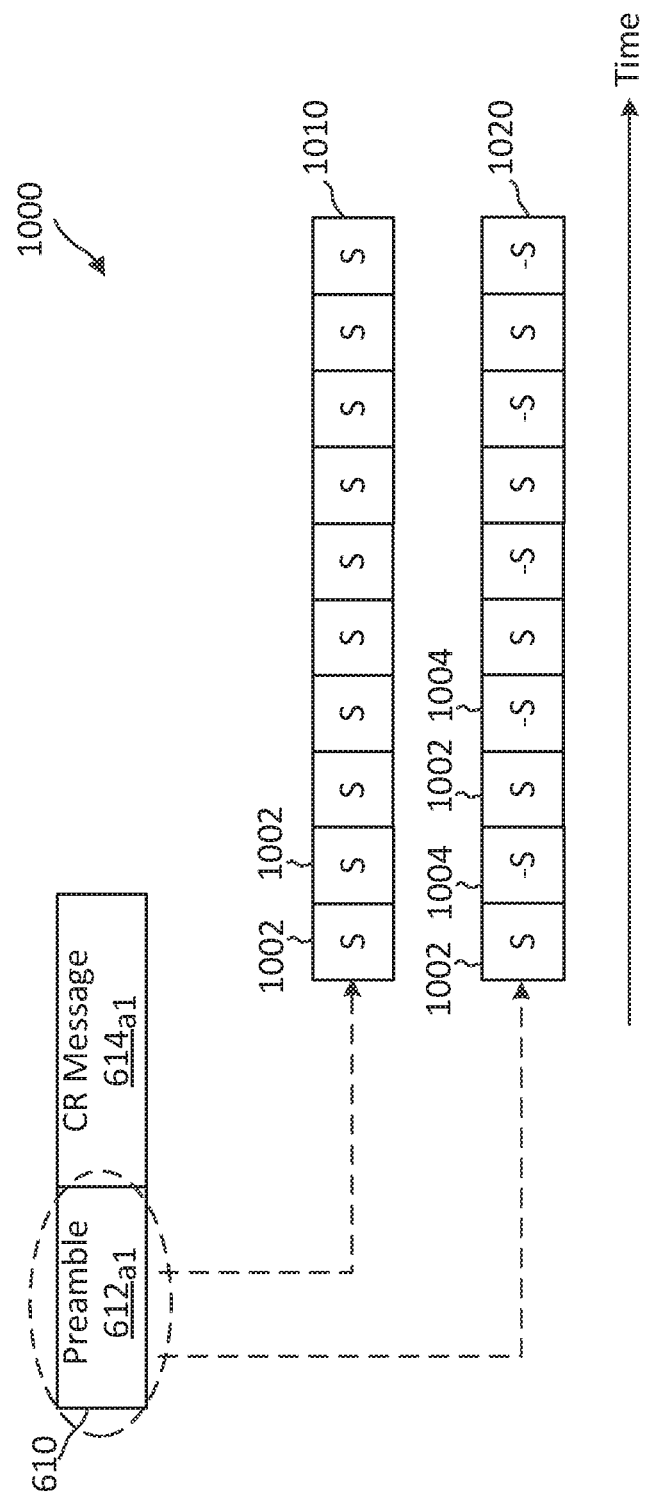
FIG. 10 illustrates a channel reservation signal configuration scheme for multi-RAT medium sharing according to embodiments of the present disclosure.

FIG. 10 illustrates a channel reservation signal configuration scheme 1000 for multi-RAT medium sharing according to embodiments of the present disclosure. In FIG. 10, the x-axis represents time in some constant units. The scheme 1000 may be employed by nodes or devices (e.g., BSs 105 and 205 and the UEs 115 and 215) of different RATs (e.g., NR and WiFi) to transmit a channel reservation signal 610 to reserve a TXOP (e.g., the TXOP 302) in a shared spectrum (e.g., the spectrum 301). The scheme 1000 indicates the two TXOP duration hypotheses using different phases between adjacent short-period waveform sequences. In some embodiments, the short-period waveform sequence may be the same as the STF in a WiFi preamble.

For example, a preamble signal 1010 with no phase jump can be used to indicate a reservation duration of X ms (e.g., the predetermined TXOP duration 602) for RAT-level sharing and a preamble signal 1020 with phase jump can be used to indicate a reservation duration of less than X ms for intra-RAT sharing. As shown, the preamble signal 1010 includes repetitions of a short-period waveform sequence 1002, represented by S, with the same phase for all repetitions, whereas the preamble signal 1020 includes repetitions of alternating short-period waveform sequence 1002 and 1004. The sequence 1004 may be the same as the sequence 1002, but with a phase shift of about 180 degrees. The sequence 1004 is represented by −S. Thus, a monitoring node may differentiate a channel reservation for sharing across RATs or for sharing within a RAT based on the phase shifts between adjacent sequences within a detected preamble. For example, when the sequence 1002 and 1004 has a period of about 0.8 µs, a monitoring node may observe a phase jump at a periodicity of about 0.8 µs when the preamble signal 1020 is detected.

As described above, the schemes 800, 900, and 1000 use waveform-based sequences in the preamble portion 612 to allow for autocorrelation-based detection, which is not sequence dependent. Thus, no change is required at a WiFi receiver for preamble detection to support the schemes 800, 900, and 1000 for multi-RAT medium sharing.

Figure 11:
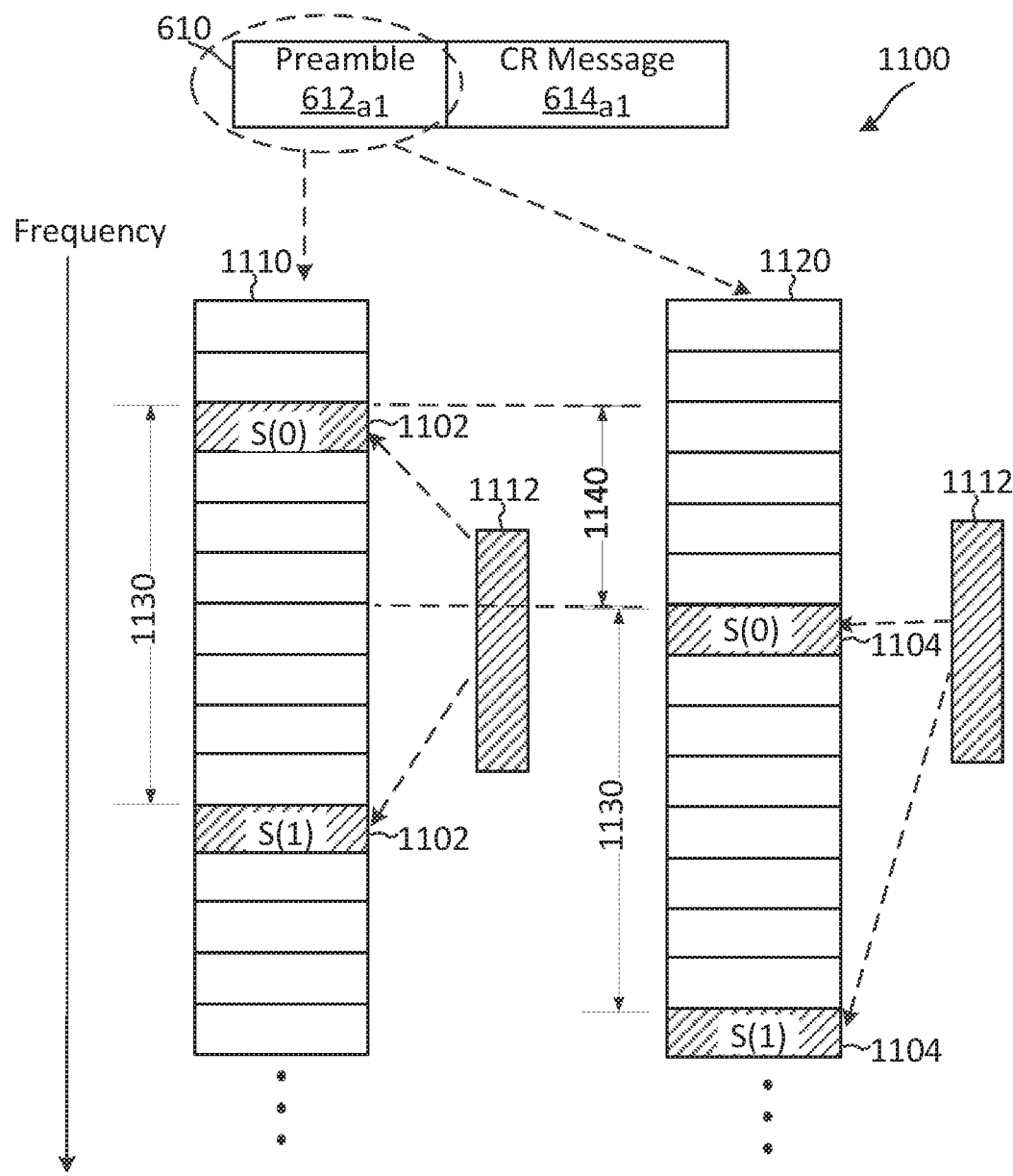
FIG. 11 illustrates a channel reservation signal configuration scheme for multi-RAT medium sharing according to embodiments of the present disclosure.

FIG. 11 illustrates a channel reservation signal configuration scheme 1100 for multi-RAT medium sharing according to embodiments of the present disclosure. In FIG. 11, the y-axis represents frequency in some constant units. The scheme 1100 may be employed by nodes or devices (e.g., BSs 105 and 205 and the UEs 115 and 215) of different RATs (e.g., NR and WiFi) to transmit a channel reservation signal 610 to reserve a TXOP (e.g., the TXOP 302) in a shared spectrum (e.g., the spectrum 301). The scheme 1100 indicates the two TXOP duration hypotheses by mapping a short-period waveform sequence 1112 (e.g., the waveform sequences 812, 822, 912, 1002), represented by S, to different tone locations 1102 and 1104.

In some embodiments, the short-period waveform sequence 1112 may be the same as the STF in a WiFi preamble. The scheme 1100 may substantially similar to the scheme 900, but the tone locations 1102 and 1104 may have a greater tone spacing 1130 and may be offset by a greater tone offset 1140. For example, the tone spacing 1130 may be about double the tone spacing 930 and the tone offset 1140 may be about double the tone offset 940 in the scheme 900. In some embodiments, the tone spacing 1130 may be about 2.5 MHz.

As shown, the tone locations 1102 can be used to indicate a reservation duration of X ms (e.g., the predetermined TXOP duration 602) for RAT-level sharing and the tone locations 1104 can be used to indicate a reservation duration of less than X ms for intra-RAT sharing. The tone locations 1102 and 1104 are staggered and offset by a tone offset 1140. The waveform sequence 1112 may be mapped to the tone locations 1102 spaced apart by a tone spacing 1130 to form a preamble signal 1110, which may be repeated in time in the preamble portion 612. Similarly, the waveform sequence 1112 may be mapped to the tone locations 1104 spaced apart by the same tone spacing 1130 to form a preamble signal 1120, which may be repeated in time in the preamble portion 612. Thus, a monitoring node may differentiate a channel reservation for sharing across RATs or for sharing within a RAT based on the tone locations (e.g., the tone locations 1102 or the tone locations 1104) of the sequences in a detected preamble.

In some embodiments, the scheme 1100 may be used in conjunction with the scheme 1000. For example, the preamble signal 1120 may include a phase jump between adjacent short waveform sequences 1112. In such embodiments, a monitoring node may observe a phase jump at a periodicity of about 0.4 µs instead of 0.8 µs as in the scheme 900 when the preamble signal 1120 is detected.

Figure 12:
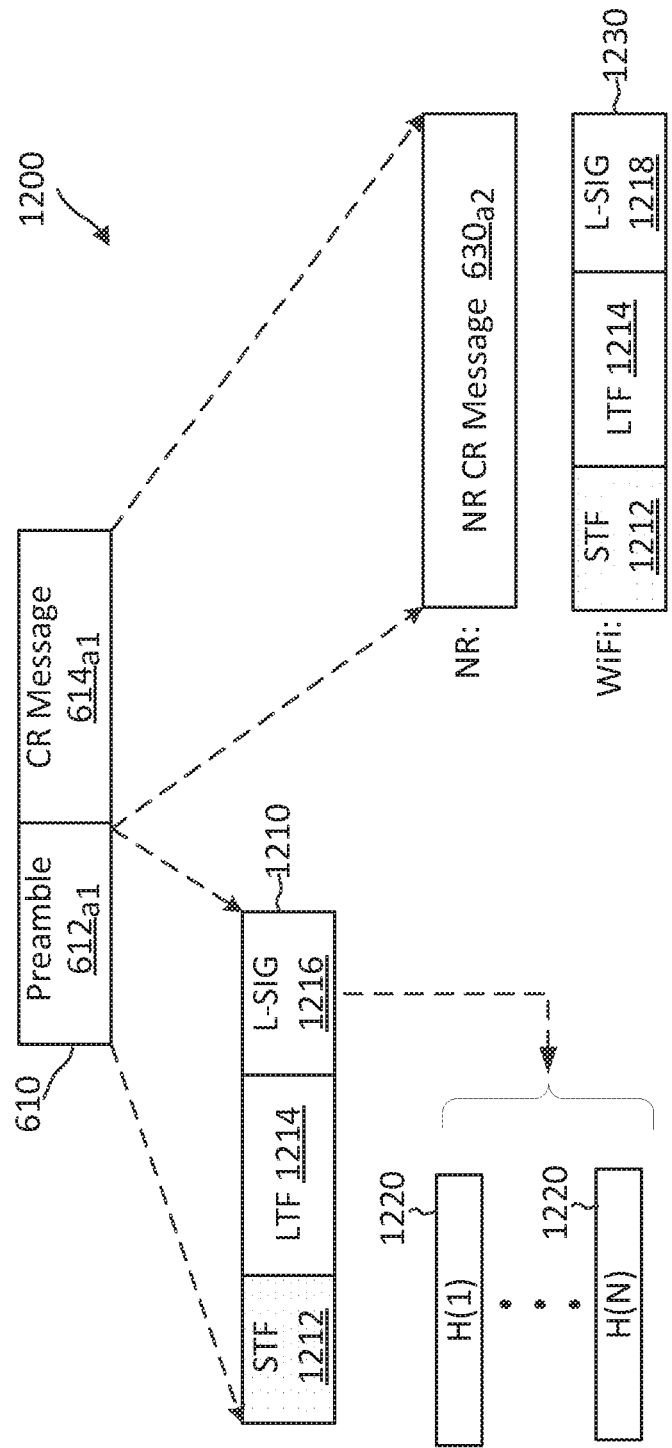
FIG. 12 illustrates a channel reservation signal configuration scheme for multi-RAT medium sharing scheme according to embodiments of the present disclosure.

FIG. 12 illustrates a channel reservation signal configuration scheme 1200 for multi-RAT medium sharing according to embodiments of the present disclosure. The scheme 1200 may be employed by nodes or devices (e.g., BSs 105 and 205 and the UEs 115 and 215) of different RATs (e.g., NR and WiFi) to transmit a channel reservation signal 610 to reserve a TXOP (e.g., the TXOP 302) in a shared spectrum (e.g., the spectrum 301). The scheme 1200 can be used in conjunction with the method 700 described above with respect to FIG. 7 for channel reservation detection. The scheme 1200 reuses the WiFi preamble structure for a preamble signal 1210, which may be transmitted within a preamble portion 612 of the channel reservation signal 610.

As shown, the preamble signal 1210 includes an STF 1212, an LTF 1214 (e.g., the LTF 640), and an L-SIG field 1216 (e.g., the L-SIG field 642) similar to the STF, LTF, and L-SIG field in a WiFi preamble, respectively. The preamble signal 1210 may be transmitted using the WiFi numerology irrespective of whether the transmitter is a WiFi transmitter or an NR transmitter. To minimize complexity, the L-SIG field 1216 may allow a limited number of reservation durations or hypotheses 1220 shown as H(1) to H(N).

In one embodiment, the L-SIG field 1216 may allow for multiple hypotheses 1220 (e.g., as many hypotheses as in current WiFi). The L-SIG field 1216 may indicate a predetermined TXOP duration of X ms (e.g., the predetermined TXOP duration 602) via a specific hypothesis or a reservation duration that is not X ms (e.g., <X ms) with remaining hypotheses.

In another embodiment, the L-SIG field 1216 may allow for multiple hypotheses 1220 (e.g., about 8 or 12). The L-SIG field 1216 may indicate a reservation duration at a coarser resolution (e.g., of about 0.5 ms or 1 ms) than the WiFi NAV allowable resolution (e.g., of about 0.4 µs). In some embodiments, the preamble signal 1210 may include a data field and the reservation duration may be indicated in the data field instead of the L-SIG field 1216.

When employing the scheme 1200, a WiFi node may transmit a channel reservation signal 610 including the preamble signal 1210 in the preamble portion 612 for RAT-level sharing and may transmit an additional WiFi preamble 1230 including an STF 1212, an LTF 1214, and an L-SIG field 1218 in the message portion 614 to indicate the channel reservation for sharing among WiFi nodes. The L-SIG field 1218 may allow a reservation duration between about 0 ms to about 5.46 ms with a resolution of about 0.4 μs as defined for WiFi preambles.

An NR node may transmit a channel reservation signal 610 may including the preamble signal 1210 in the preamble portion 612 for RAT-level sharing and may subsequently transmit an NR channel reservation message 630 in the message portion 614 to indicate the channel reservation for sharing among NR nodes. Since the L-SIG field may include a limited number of resolutions or hypotheses, NR nodes may determine a channel status (e.g., idle or busy) based on non-coherent detection of the preamble signal 1210 in a time domain without resampling the preamble signal 1210.

In some embodiments, an NR receiver may store sequences of the STF 1212 and LTF 1214 and/or the L-SIG field 1216 signal resampled with NR numerology in a memory (e.g., the memory 404 or 504). During detection, the NR receiver may receive the preamble signal 1210 (e.g., samples of the STF and/or LTF sequences) using NR numerology. The NR receiver may perform channel estimation based on correlations of the received STF and/or LTF samples with the pre-stored resampled STF and/or LTF sequences, respectively. The NR receiver may determine the content of the L-SIG field 1216 based on the determined channel estimate. The detection of the L-SIG field 1216 may be carried out in a time domain instead of in a frequency domain.

Figure 13:
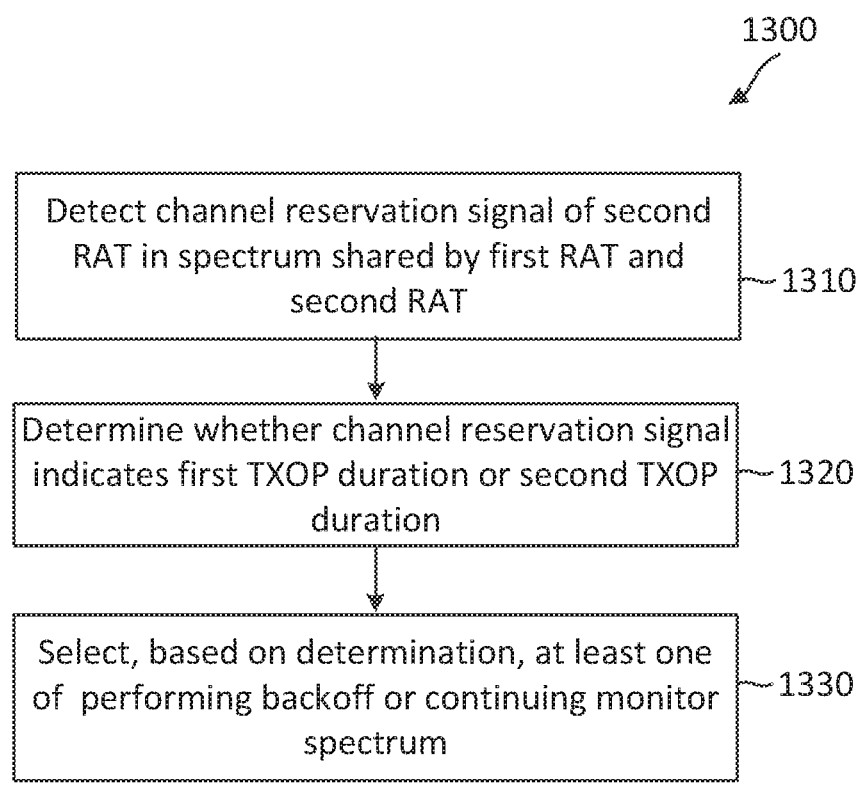
FIG. 13 is a flow diagram of a multi-RAT medium sharing method according to embodiments of the present disclosure.

FIG. 13 is a flow diagram of a multi-RAT medium sharing method 1300 according to embodiments of the present disclosure. Steps of the method 1300 can be executed by a computing device (e.g., a processor, processing circuit, and/or other suitable component) of a wireless communication device, such as the BSs 105, 205, and 500, the UEs 115, 215, and 400. The method 1300 may employ similar mechanisms as in the schemes 600, 800, 900, 1000, 1100, and 1200 and the method 700 described with respect to FIGS. 6, 8, 9, 10, 11, 12, and 7 respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes detecting, by a wireless communication device of a first RAT, a channel reservation signal (e.g., the channel reservation signal 610) of a second RAT in a spectrum (e.g., the spectrum 301) shared by the first RAT and the second RAT. For example, the first RAT may be NR and the second RAT may be WiFi. Alternatively, the first RAT may be WiFi and the second RAT may be NR.

At step 1320, the method 1300 includes determining whether the detected channel reservation signal indicates a first TXOP duration or a second TXOP duration. For example, the first TXOP duration may correspond to a predetermined TXOP duration of X ms (e.g., the predetermined TXOP duration 602) for RAT-level medium sharing and the second TOXP duration may correspond to a reservation duration of less than X ms (e.g., the portion 606).

In an embodiment, the determination may be based on whether the channel reservation signal includes a first waveform sequence (e.g., the sequence 812) representing the first TXOP duration or a second waveform sequence (e.g., the sequence 822) representing the second TXOP duration.

In an embodiment, the determination may be based on whether the channel reservation signal includes a waveform sequence at a first set of tone locations (e.g., the tone locations 902 or 1102) representing the first TXOP duration or at a second set of tone locations (e.g., the tone locations 904 or 1104) representing the second TXOP duration.

In an embodiment, the determination may be based on whether adjacent waveform sequences in the channel reservation signal include a first phase shift (e.g., of 0 degree) representing the first TXOP duration or a second phase shift (e.g., of about 180 degrees) representing the second TXOP duration.

In an embodiment, the determination may be based on whether the channel reservation signal includes a field associated with the first TXOP duration (e.g., the hypotheses 1220).

At step 1330, the method 1300 includes selecting, based on the determination, at least one of performing a backoff or continuing to monitor the spectrum. For example, the method 1300 may include performing the backoff when the channel reservation signal indicates the first TXOP duration and continuing to monitor the spectrum when the channel reservation signal indicates the second TXOP duration.

In some embodiments, the method 1300 may further include determining that the channel reservation signal is of the second RAT when the decoding of a channel reservation message (e.g., the message portion 614) in the channel reservation signal sis unsuccessful.

Figure 14:
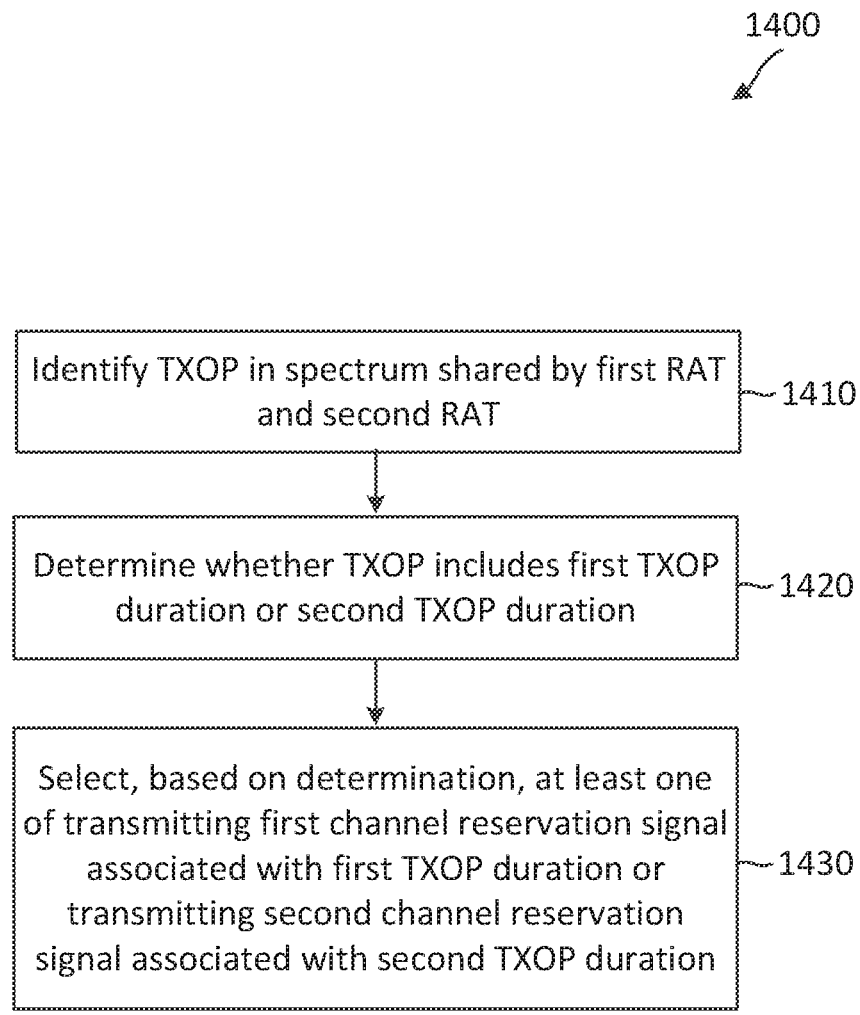
FIG. 14 is a flow diagram of a multi-RAT medium sharing method according to embodiments of the present disclosure.

FIG. 14 is a flow diagram of a multi-RAT medium sharing method 1400 according to embodiments of the present disclosure. Steps of the method 1400 can be executed by a computing device (e.g., a processor, processing circuit, and/or other suitable component) of a wireless communication device, such as the BSs 105, 205, and 500, the UEs 115, 215, and 400. The method 1400 may employ similar mechanisms as in the schemes 600, 800, 900, 1000, 1100, and 1200 and the method 700 described with respect to FIGS. 6, 8, 9, 10, 11, 12, and 7 respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes identifying, by a wireless communication device of a first RAT, a TXOP (e.g., the TXOP 302) in a spectrum (e.g., the spectrum 301) shared by the first RAT and a second RAT. For example, the first RAT may be NR and the second RAT may be WiFi. Alternatively, the first RAT may be WiFi and the second RAT may be NR.

At step 1420, the method 1400 includes determining whether the TXOP includes a first TXOP duration or a second TXOP duration that is different from the first TXOP duration. For example, the first TXOP duration may correspond to a predetermined TXOP duration of X ms (e.g., the predetermined TXOP duration 602) for RAT-level medium sharing and the second TOXP duration may correspond to a reservation duration of less than X ms (e.g., the portion 606).

At step 1430, the method 1400 includes selecting, based on the determination, at least one of transmitting a first channel reservation signal associated with the first TXOP duration or transmitting a second channel reservation signal associated with the second TXOP duration.

In an embodiment, the method 1400 may include transmitting the first channel reservation signal including a first waveform sequence (e.g., the sequence 812) to indicate the first TXOP duration and transmitting the second channel reservation signal including a second waveform sequence (e.g., the sequence 812) to indicate the second TXOP duration.

In an embodiment, the method 1400 may include transmitting the first channel reservation signal including a waveform sequence at a first set of tone locations (e.g., the tone locations 902 or 1102) to indicate the first TXOP duration and transmitting the second channel reservation signal including the waveform sequence at a second set of tone locations (e.g., the tone locations 904 or 1104) to indicate the second TXOP duration.

In an embodiment, the method 1400 may include transmitting the first channel reservation signal including a plurality of waveform sequences with a first phase shift (e.g., of 0 degree) between adjacent waveform sequences to indicate the first TXOP duration and transmitting the second channel reservation signal including a plurality of waveform sequences with a second phase shift (e.g., of about 180 degrees) between adjacent waveform sequences to indicate the second TXOP duration.

In an embodiment, the second RAT includes a WiFi technology and the method 1400 may include transmitting the first channel reservation signal to indicate the first TXOP duration based on a numerology of the WiFi technology and transmitting the second channel reservation signal to indicate the second TXOP duration based on the numerology of the WiFi technology.

In an embodiment, the method 1400 may include transmitting the first channel reservation signal including a field (e.g., the L-SIG field 1216 or a data field) to indicate the first TXOP duration (e.g., the hypotheses 1220) and transmitting the second channel reservation signal including a field to indicate the second TXOP duration (e.g., the hypotheses 1220).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a computer-readable medium having program code recorded thereon, the program code comprising code for causing a first wireless communication device of a first radio access technology (RAT) to detect a channel reservation signal of a second RAT in a spectrum shared by the first RAT and the second RAT; code for causing the first wireless communication device to determine whether the channel reservation signal indicates a first transmission opportunity (TXOP) duration or a second TXOP duration that is different from the first TXOP duration; and code for causing the first wireless communication device to select, based on the determination, at least one of performing a backoff or continuing to monitor the spectrum.

In some embodiments, wherein the first TXOP duration is a predetermined TXOP duration for sharing the spectrum between the first RAT and the second RAT, and wherein the second TXOP duration is shorter than the first TXOP duration. In some embodiments, the computer-readable medium further comprises code for causing the first wireless communication device to perform the backoff when the channel reservation signal indicates the first TXOP duration; and code for causing the first wireless communication device to continue to monitor the spectrum when the channel reservation signal indicates the second TXOP duration. In some embodiments, wherein the code for causing the first wireless communication device to determine whether the channel reservation signal indicates the first TXOP duration or the second TXOP duration is further configured to determine whether the channel reservation signal includes a first waveform sequence representing the first TXOP duration or a second waveform sequence representing the second TXOP duration. In some embodiments, wherein the code for causing the first wireless communication device to determine whether the channel reservation signal indicates the first TXOP duration or the second TXOP duration is further configured to determine whether the channel reservation signal includes a waveform sequence at a first set of tone locations representing the first TXOP duration or at a second set of tone locations representing the second TXOP duration. In some embodiments, wherein the code for causing the first wireless communication device to determine whether the channel reservation signal indicates the first TXOP duration or the second TXOP duration is further configured to determine whether adjacent waveform sequences in the channel reservation signal include a first phase shift representing the first TXOP duration or a second phase shift representing the second TXOP duration. In some embodiments, wherein the first RAT or the second RAT includes an Institute of Electrical and Electronics Engineers (IEEE) 802.11 (WiFi) technology. In some embodiments, wherein the code for causing the first wireless communication device to determine whether the channel reservation signal indicates the first TXOP duration or the second TXOP duration is further configured to determine whether the channel reservation signal includes a field associated with the first TXOP duration. In some embodiments, the computer-readable medium further comprises code for causing the first wireless communication device to receive a channel reservation message associated with the channel reservation signal; and code for causing the first wireless communication device to determine that the channel reservation signal is of the second RAT when decoding the channel reservation message is unsuccessful.

Further embodiments of the present disclosure include a computer-readable medium having program code recorded thereon, the program code comprising code for causing a first wireless communication device of a first radio access technology (RAT) to identify a transmission opportunity (TXOP) in a spectrum shared by the first RAT and a second RAT; code for causing the first wireless communication device to determine whether the TXOP includes a first TXOP duration or a second TXOP duration that is different from the first TXOP duration; and code for causing the first wireless communication device to select, based on the determination, at least one of transmitting a first channel reservation signal associated with the first TXOP duration or transmitting a second channel reservation signal associated with the second TXOP duration.

In some embodiments, wherein the first TXOP duration is a predetermined TXOP duration for sharing the spectrum between the first RAT and the second RAT, and wherein the second TXOP duration is shorter than the first TXOP duration. In some embodiments, the computer-readable medium of claim 42, further comprising code for causing the first wireless communication device to transmit the first channel reservation signal including a first waveform sequence to indicate the first TXOP duration; and code for causing the first wireless communication device to transmit the second channel reservation signal including a second waveform sequence to indicate the second TXOP duration. In some embodiments, the computer-readable medium further comprises code for causing the first wireless communication device to transmit the first channel reservation signal including a waveform sequence at a first set of tone locations to indicate the first TXOP duration; and code for causing the first wireless communication device to transmit the second channel reservation signal including the waveform sequence at a second set of tone locations to indicate the second TXOP duration. In some embodiments, the computer-readable medium further comprises code for causing the first wireless communication device to transmit the first channel reservation signal including a plurality of waveform sequences with a first phase shift between adjacent waveform sequences to indicate the first TXOP duration; and code for causing the first wireless communication device to transmit the second channel reservation signal including a plurality of waveform sequences with a second phase shift between adjacent waveform sequences to indicate the second TXOP duration. In some embodiments, wherein the second RAT includes an Institute of Electrical and Electronics Engineers (IEEE) 802.11 (WiFi) technology, and wherein the computer-readable medium further comprises code for causing the first wireless communication device to transmit the first channel reservation signal to indicate the first TXOP duration based on a numerology of the WiFi technology; and code for causing the first wireless communication device to transmit the second channel reservation signal to indicate the second TXOP duration based on the numerology of the WiFi technology. In some embodiments, the computer-readable medium further comprises code for causing the first wireless communication device to transmit the first channel reservation signal including a field to indicate the first TXOP duration; and code for causing the first wireless communication device to transmit the second channel reservation signal including a field to indicate the second TXOP duration.

Further embodiments of the present disclosure include an apparatus comprising means for detecting a channel reservation signal of a second radio access technology (RAT) in a spectrum shared by a first RAT and the second RAT, wherein the apparatus is associated with the first RAT; means for determining whether the channel reservation signal indicates a first transmission opportunity (TXOP) duration or a second TXOP duration that is different from the first TXOP duration; and means for selecting, based on the determination, at least one of performing a backoff or continuing to monitor the spectrum.

In some embodiments, wherein the first TXOP duration is a predetermined TXOP duration for sharing the spectrum between the first RAT and the second RAT, and wherein the second TXOP duration is shorter than the first TXOP duration. In some embodiments, the apparatus further comprises means for performing the backoff when the channel reservation signal indicates the first TXOP duration; and means for continuing to monitor the spectrum when the channel reservation signal indicates the second TXOP duration. In some embodiments, wherein the means for determining whether the channel reservation signal indicates the first TXOP duration or the second TXOP duration is further configured to determine whether the channel reservation signal includes a first waveform sequence representing the first TXOP duration or a second waveform sequence representing the second TXOP duration. In some embodiments, wherein the means for determining whether the channel reservation signal indicates the first TXOP duration or the second TXOP duration is further configured to determine whether the channel reservation signal includes a waveform sequence at a first set of tone locations representing the first TXOP duration or at a second set of tone locations representing the second TXOP duration. In some embodiments, wherein the means for determining whether the channel reservation signal indicates the first TXOP duration or the second TXOP duration is further configured to determine whether adjacent waveform sequences in the channel reservation signal include a first phase shift representing the first TXOP duration or a second phase shift representing the second TXOP duration. In some embodiments, wherein the first RAT or the second RAT includes an Institute of Electrical and Electronics Engineers (IEEE) 802.11 (WiFi) technology. In some embodiments, wherein the means for determining whether the channel reservation signal indicates the first TXOP duration or the second TXOP duration is further configured to determine whether the channel reservation signal includes a field associated with the first TXOP duration. In some embodiments, the apparatus further comprises means for receiving a channel reservation message associated with the channel reservation signal; and means for determining that the channel reservation signal is of the second RAT when decoding the channel reservation message is unsuccessful.

Further embodiments of the present disclosure include an apparatus comprising means for identifying a transmission opportunity (TXOP) in a spectrum shared by a first radio access technology (RAT) and a second RAT, wherein the apparatus is associated with the first RAT; means for determining whether the TXOP includes a first TXOP duration or a second TXOP duration that is different from the first TXOP duration; and means for selecting, based on the determination, at least one of transmitting a first channel reservation signal associated with the first TXOP duration or transmitting a second channel reservation signal associated with the second TXOP duration.

In some embodiments, wherein the first TXOP duration is a predetermined TXOP duration for sharing the spectrum between the first RAT and the second RAT, and wherein the second TXOP duration is shorter than the first TXOP duration. In some embodiments, the apparatus further comprises means for transmitting the first channel reservation signal including a first waveform sequence to indicate the first TXOP duration; and means for transmitting the second channel reservation signal including a second waveform sequence to indicate the second TXOP duration. In some embodiments, the apparatus further comprises means for transmitting the first channel reservation signal including a waveform sequence at a first set of tone locations to indicate the first TXOP duration; and means for transmitting the second channel reservation signal including the waveform sequence at a second set of tone locations to indicate the second TXOP duration. In some embodiments, the apparatus further comprises means for transmitting the first channel reservation signal including a plurality of waveform sequences with a first phase shift between adjacent waveform sequences to indicate the first TXOP duration; and means for transmitting the second channel reservation signal including a plurality of waveform sequences with a second phase shift between adjacent waveform sequences to indicate the second TXOP duration. In some embodiments, wherein the second RAT includes an Institute of Electrical and Electronics Engineers (IEEE) 802.11 (WiFi) technology, and wherein the apparatus further comprises means for transmitting the first channel reservation signal to indicate the first TXOP duration based on a numerology of the WiFi technology; and means for transmitting the second channel reservation signal to indicate the second TXOP duration based on the numerology of the WiFi technology. In some embodiments, the apparatus further comprises means for transmitting the first channel reservation signal including a field to indicate the first TXOP duration; and means for transmitting the second channel reservation signal including a field to indicate the second TXOP duration.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   detecting, by a wireless communication device of a first radio access technology (RAT), a channel reservation signal of a second RAT in a spectrum shared by the first RAT and the second RAT;
   determining, by the wireless communication device based on a repeating waveform sequence of the channel reservation signal, whether the channel reservation signal indicates a first transmission opportunity (TXOP) duration or a second TXOP duration that is different from the first TXOP duration; and
   carrying out, by the wireless communication device based on the determining, at least one of:
   performing a backoff when the channel reservation signal indicates the first TXOP duration; or
   continuing to monitor the spectrum when the channel reservation signal indicates the second TXOP duration.

2. The method of claim 1, wherein the first TXOP duration is a predetermined TXOP duration for sharing the spectrum between the first RAT and the second RAT, and wherein the second TXOP duration is shorter than the first TXOP duration.

3. The method of claim 2, wherein the second TXOP duration is configured for intra-RAT sharing.

4. The method of claim 1, wherein the determining includes:
   determining whether the repeating waveform sequence of the channel reservation signal includes a first waveform sequence representing the first TXOP duration or a second waveform sequence representing the second TXOP duration.

5. The method of claim 1, wherein the determining includes:
   determining whether the repeating waveform sequence of the channel reservation signal is at a first set of tone locations representing the first TXOP duration or at a second set of tone locations representing the second TXOP duration.

6. The method of claim 1, wherein the determining includes:
   determining whether adjacent waveform sequences in the channel reservation signal include a first phase shift representing the first TXOP duration or a second phase shift representing the second TXOP duration.

7. The method of claim 1, further comprising:
   receiving, by the wireless communication device, a channel reservation message associated with the channel reservation signal; and
   determining, by the wireless communication device, that the channel reservation signal is of the second RAT when decoding the channel reservation message is unsuccessful.

8. A method of wireless communication, comprising:
   identifying, by a wireless communication device of a first radio access technology (RAT), a transmission opportunity (TXOP) in a spectrum shared by the first RAT and a second RAT;
   determining, by the wireless communication device, whether the TXOP includes a first TXOP duration or a second TXOP duration that is different from the first TXOP duration;
   selecting, based on the determination, at least one of transmitting a first channel reservation signal associated with the first TXOP duration or transmitting a second channel reservation signal associated with the second TXOP duration; and
   transmitting, by the wireless communication device based on the selecting, at least one of:
   the first channel reservation signal including a first repeating waveform sequence to indicate the first TXOP duration; or
   the second channel reservation signal including a second repeating waveform sequence to indicate the second TXOP duration.

9. The method of claim 8, wherein the first TXOP duration is a predetermined TXOP duration for sharing the spectrum between the first RAT and the second RAT, and wherein the second TXOP duration is shorter than the first TXOP duration.

10. The method of claim 8, wherein the second TXOP duration is configured for intra-RAT sharing.

11. The method of claim 8, further comprising wherein the transmitting, based on the selecting, further includes at least one of:
   transmitting, by the wireless communication device, the first channel reservation signal including the first repeating waveform sequence at a first set of tone locations to indicate the first TXOP duration; or
   transmitting, by the wireless communication device, the second channel reservation signal including the second repeating waveform sequence at a second set of tone locations to indicate the second TXOP duration.

12. The method of claim 8, wherein the transmitting, based on the selecting, further includes at least one of:
   transmitting, by the wireless communication device, the first channel reservation signal including a plurality of repeating waveform sequences, including the first repeating waveform sequence, with a first phase shift between adjacent waveform sequences to indicate the first TXOP duration; or
   transmitting, by the wireless communication device, the second channel reservation signal including a plurality of repeating waveform sequences, including the second repeating waveform sequence, with a second phase shift between adjacent waveform sequences to indicate the second TXOP duration.

13. The method of claim 8, wherein the second RAT includes an Institute of Electrical and Electronics Engineers (IEEE) 802.11 (WiFi) technology, and wherein the transmitting, based on the selecting, further includes at least one of:
   transmitting, by the wireless communication device, the first channel reservation signal to indicate the first TXOP duration based on at least one of a subcarrier spacing or a sampling rate of the WiFi technology; or
   transmitting, by the wireless communication device, the second channel reservation signal to indicate the second TXOP duration based on the at least one of the subcarrier spacing or the sampling rate of the WiFi technology.

14. The method of claim 8, wherein the transmitting, based on the selecting, further includes at least one of:
   transmitting, by the wireless communication device, the first repeating waveform sequence in a preamble of the first channel reservation signal; or
   transmitting, by the wireless communication device, the second repeating waveform sequence in a preamble of the second channel reservation signal.

15. An apparatus comprising:
   a transceiver configured to detect a channel reservation signal of a second radio access technology (RAT) in a spectrum shared by a first RAT and the second RAT, wherein the apparatus is associated with the first RAT; and
   a processor configured to:
      determine, based on a repeating waveform sequence of the channel reservation signal, whether the channel reservation signal indicates a first transmission opportunity (TXOP) duration or a second TXOP duration that is different from the first TXOP duration; and
      carry out, based on the determination, at least one of:
         performing a backoff when the channel reservation signal indicates the first TXOP duration; or
         continuing to monitor the spectrum when the channel reservation signal indicates the second TXOP duration.

16. The apparatus of claim 15, wherein the first TXOP duration is a predetermined TXOP duration for sharing the spectrum between the first RAT and the second RAT, and wherein the second TXOP duration is shorter than the first TXOP duration.

17. The apparatus of claim 16, wherein the second TXOP duration is configured for intra-RAT sharing.

18. The apparatus of claim 15, wherein the processor is further configured to determine whether the channel reservation signal indicates the first TXOP duration or the second TXOP duration by:
   determining whether the repeating waveform sequence of the channel reservation signal includes a first waveform sequence representing the first TXOP duration or a second waveform sequence representing the second TXOP duration.

19. The apparatus of claim 15, wherein the processor is further configured to determine whether the channel reservation signal indicates the first TXOP duration or the second TXOP duration by:
   determining whether the repeating waveform sequence is at a first set of tone locations representing the first TXOP duration or at a second set of tone locations representing the second TXOP duration.

20. The apparatus of claim 15, wherein the processor is further configured to determine whether the channel reservation signal indicates the first TXOP duration or the second TXOP duration by:
   determining whether adjacent waveform sequences in the channel reservation signal include a first phase shift representing the first TXOP duration or a second phase shift representing the second TXOP duration.

21. The apparatus of claim 15, wherein the transceiver is further configured to receive a channel reservation message associated with the channel reservation signal, and wherein the processor is further configured to determine that the channel reservation signal is of the second RAT when decoding the channel reservation message is unsuccessful.

22. An apparatus comprising:
   a transceiver; and
   a processor configured to:
      identify a transmission opportunity (TXOP) in a spectrum shared by a first radio access technology (RAT) and a second RAT, wherein the apparatus is associated with the first RAT;
      determine whether the TXOP includes a first TXOP duration or a second TXOP duration that is different from the first TXOP duration;
      select, based on the determination, at least one of configuring the transceiver to transmit a first channel reservation signal associated with the first TXOP duration or configuring the transceiver to transmit a second channel reservation signal associated with the second TXOP duration; and
      cause the transceiver to transmit, based on the selecting, at least one of:
         the first channel reservation signal including a first repeating waveform sequence to indicate the first TXOP duration; or
         the second channel reservation signal including a second repeating waveform sequence to indicate the second TXOP duration.

23. The apparatus of claim 22, wherein the first TXOP duration is a predetermined TXOP duration for sharing the spectrum between the first RAT and the second RAT, and wherein the second TXOP duration is shorter than the first TXOP duration.

24. The apparatus of claim 22, wherein the second TXOP duration is configured for intra-RAT sharing.

25. The apparatus of claim 22, wherein the transceiver is further configured to transmit, based on the selecting, at least one of:
the first channel reservation signal including the first repeating waveform sequence at a first set of tone locations to indicate the first TXOP duration; or
the second channel reservation signal including the second repeating waveform sequence at a second set of tone locations to indicate the second TXOP duration.

26. The apparatus of claim 22, wherein the transceiver is further configured to transmit, based on the selecting, at least one of:
the first channel reservation signal including a plurality of repeating waveform sequences, including the first repeating waveform sequence, with a first phase shift between adjacent waveform sequences to indicate the first TXOP duration; and
the second channel reservation signal including a plurality of waveform sequences, including the second repeating waveform sequence, with a second phase shift between adjacent waveform sequences to indicate the second TXOP duration.

27. The apparatus of claim 22, wherein the second RAT includes an Institute of Electrical and Electronics Engineers (IEEE) 802.11 (WiFi) technology, and wherein the transceiver is further configured to transmit, based on the selecting, at least one of:
the first channel reservation signal to indicate the first TXOP duration based on at least one of a subcarrier spacing or a sampling rate of the WiFi technology; or
the second channel reservation signal to indicate the second TXOP duration based on the at least one of the subcarrier spacing or the sampling rate of the WiFi technology.

28. The apparatus of claim 22, wherein the transceiver is further configured to transmit, based on the selecting, at least one of:
the first repeating waveform sequence in a preamble of the first channel reservation signal; or
the second repeating waveform sequence in a preamble of the second channel reservation signal including a field to indicate the second TXOP duration.

\* \* \* \* \*